(12) United States Patent
Khan et al.

(10) Patent No.: US 10,721,354 B2
(45) Date of Patent: Jul. 21, 2020

(54) VENUE OWNER-CONTROLLABLE PER-VENUE SERVICE CONFIGURATION

(71) Applicant: NOKIA SOLUTIONS AND NETWORKS OY, Espoo (FI)

(72) Inventors: Gul Wiqar Khan, Espoo (FI); Kalle Eino Olavi Nyman, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/394,771

(22) Filed: Apr. 25, 2019

(65) Prior Publication Data

US 2019/0253557 A1    Aug. 15, 2019

Related U.S. Application Data

(62) Division of application No. 15/039,190, filed as application No. PCT/EP2013/074697 on Nov. 26, 2013, now Pat. No. 10,320,973.

(51) Int. Cl.
*H04W 24/00*    (2009.01)
*H04M 3/42*    (2006.01)
(Continued)

(52) U.S. Cl.
CPC .... *H04M 3/42348* (2013.01); *H04L 41/0803* (2013.01); *H04L 41/5051* (2013.01);
(Continued)

(58) Field of Classification Search
USPC ............................. 455/411, 520, 419, 41.2
See application file for complete search history.

(56) References Cited

U.S. PATENT DOCUMENTS 6,987,975 B1    1/2006 Irvin et al.
8,193,929 B1    6/2012 Siu et al.
(Continued)

FOREIGN PATENT DOCUMENTS

WO    WO 2008/010806 A1    1/2008
WO    WO 2009/088823 A2    7/2009

OTHER PUBLICATIONS

International Search Report & Written Opinion dated Mar. 19, 2014 corresponding to International Patent Application No. PCT/EP2013/074697. No copy provided, per MPEP 609. Submitted in parent U.S. Appl. No. 15/039,190.

(Continued)

*Primary Examiner* — David Q Nguyen
(74) *Attorney, Agent, or Firm* — Squire Patton Boggs (US) LLP

(57) ABSTRACT

There are provided measures for venue owner-controllable per-venue service configuration. Such measures could comprise configuring a per-venue service model of services of a network operator for terminal devices of subscribers of the network operator on the basis of an input by a venue owner of a venue, the per-venue service model including at least one configurable parameter for defining a venue-based service for terminal devices of subscribers residing in a specified venue area of the venue, and controlling provision of services of the network operator to terminal devices or subscribers of terminal devices in accordance with the per-venue service model depending on applicability thereof for the service provision.

14 Claims, 12 Drawing Sheets

(51) Int. Cl.
*H04W 4/021* (2018.01)
*H04L 12/24* (2006.01)
*H04W 68/00* (2009.01)
*H04L 29/06* (2006.01)
*H04M 19/04* (2006.01)

(52) U.S. Cl.
CPC ....... *H04M 3/42144* (2013.01); *H04W 4/021* (2013.01); *H04W 68/005* (2013.01); *H04L 63/107* (2013.01); *H04L 69/28* (2013.01); *H04M 19/045* (2013.01)

(56) References Cited

U.S. PATENT DOCUMENTS

| | | | |
|---|---|---|---|
| 9,763,079 B2 | 9/2017 | Leno et al. | |
| 2003/0003901 A1 | 1/2003 | Kuroiwa | |
| 2003/0109246 A1* | 6/2003 | Shimizu | H04M 1/72577 455/411 |
| 2006/0258385 A1* | 11/2006 | Hovestadt | H04M 1/72577 455/520 |
| 2011/0003586 A1 | 1/2011 | Harrigan | |
| 2013/0017806 A1* | 1/2013 | Sprigg | H04W 12/0804 455/411 |
| 2014/0079242 A1* | 3/2014 | Nguyen | H04R 5/00 381/86 |
| 2014/0337448 A1* | 11/2014 | Kline | H04W 4/12 709/206 |
| 2015/0079965 A1* | 3/2015 | Mullins | H04W 8/20 455/419 |
| 2019/0141607 A1* | 5/2019 | Tibbitts | H04W 48/04 |

OTHER PUBLICATIONS

3GPP TS 23.018 V10.2.1 (Jun. 2011), Technical Specification, 3rd Generation Partnership Project; Technical Specification Group Core Network and Terminals; Basic call handling; Technical realization (Release 10), Jun. 2011, 294 pages. No copy provided, per MPEP 609. Submitted in parent application U.S. Appl. No. 15/039,190.

* cited by examiner

VENUE OWNER-CONTROLLABLE PER-VENUE SERVICE CONFIGURATION

CROSS REFERENCE TO RELATED APPLICATION

This is a divisional application of U.S. patent application Ser. No. 15/039,190, filed on May 25, 2016, which is a 371 of international Application No. PCT/EP2013/074697, filed on Nov. 26, 2013. The disclosures of the prior applications are hereby incorporated by reference in their entirety.

FIELD

The present invention relates to venue owner-controllable per-venue service configuration. More specifically, the present invention relates to measures (including methods, apparatuses and computer program products) for facilitating venue owner-controllable per-venue service configuration.

BACKGROUND

The present disclosure generally relates to location-aware services and configuration thereof in communication systems, such as 2G/3G/4G communication networks.

Conventionally, location-aware services are known, for which the location of a terminal device to be served is determined and the services are provided to the terminal device according to its location. Such location-aware services are typically configured by a network operator, to which the user of the terminal device in question is subscribed and via whose network the services are thus to be provided. Namely, in current service models, only the subscriber (user) and the operator have an agreement about services, e.g. location-aware services, which are to be provided by the operator to the subscriber or the subscriber's terminal device.

Accordingly, in current service models, a venue owner, i.e. a responsible for a certain venue area, is not involved in an agreement about services, e.g. location-aware services, between a subscriber and an operator. Accordingly, a venue owner is not capable of effecting or influencing a configuration of location-aware services (i.e. per-venue services) between a subscriber and an operator, even if the subscriber or the subscriber's terminal device is residing within the venue area controlled by the venue owner.

A venue may generally be any (limited) site or place, which is under the control and/or responsibility of a venue owner, and where a number of users with their terminal devices may gather. For example, a venue may be a locality such as a campus, a (e.g. religious) place, a stadium, an office building, a shopping center, or the like. In such venue, certain services or service restrictions may be desired or required by the venue owner. For example, in order to avoid disturbance of a meeting (e.g. an annual general meeting), a (e.g. religious) activity or gathering, an event, or the like in such venue, it may be expected that everybody turns off his/her terminal device or, at least, set his/her terminal device in a silence mode in which a ringing tone is suppressed.

In such exemplary situation, disturbance is difficult to be avoided in a safe manner, especially with a high number of participants, as. The venue owner can typically not ensure that everybody has actually turned off his/her terminal device or, at least, set his/her terminal device in a silence mode. For example, everybody will be disturbed when a single participant's phone is ringing because of being left in a general mode and receiving a mobile-terminated (MT) call. While jammers could be installed so as to prevent any signaling and/or traffic to arrive the terminal devices residing in the venue area, such approach has several drawbacks, such as a reduced visibility of subscribers' availability for operators in their networks, a degradation of or an uncertainty about (realistic) key performance indicators (KPIs) for the operator's networks, a need for installation of various jammers for different frequencies, and the like.

Accordingly, it would be desirable for a venue owner to be capable of effecting or influencing a configuration of location-aware services (i.e. per-venue services) for subscribers or subscriber's terminal devices residing within the venue area controlled by the venue owner.

Thus, there is a need to facilitate venue owner-controllable per-venue service configuration.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising configuring a per-venue service model of services of a network operator for terminal devices of subscribers of the network operator on the basis of an input by a venue owner of a venue, the per-venue service model including at least one configurable parameter for defining a venue-based service for terminal devices of subscribers residing in a specified venue area of the venue, and causing implementation of the configured per-venue service model for service provision for at least one of a network device of the network operator and a terminal device of a subscriber of the network operator.

According to an example aspect of the present invention, there is provided a method comprising handling a service for a terminal device of a subscriber of a network operator in a network of the network operator, verifying whether a per-venue service model of services of the network operator for terminal devices of subscribers of the network operator is applicable to the handled service for the terminal device, the per-venue service model being configurable by a venue owner of a venue and including at least one configurable parameter for defining a venue-based service for terminal devices of subscribers residing in a specified venue area of the venue, and controlling provision of the handled service to the terminal device in accordance with the per-venue service model when verified to be applicable.

According to an example aspect of the present invention, there is provided a method comprising receiving a service for a terminal device of a subscriber of a network operator via a network of the network operator, and providing the received service to the subscriber, wherein the service is received and/or provided in accordance with a per-venue service model of services of the network operator for terminal devices of subscribers of the network operator, the per-venue service model being configurable by a venue owner of a venue and including at least one configurable parameter for defining a venue-based service for terminal devices of subscribers residing in a specified venue area of the venue.

According to an example aspect of the present invention, there is provided an apparatus comprising means for, or a processor and a memory configured to store computer program code, wherein the processor is configured to cause the apparatus to perform, configuring a per-venue service model of services of a network operator for terminal devices of subscribers of the network operator on the basis of an input by a venue owner of a venue, the per-venue service model including at least one configurable parameter for defining a venue-based service for terminal devices of subscribers residing in a specified venue area of the venue, and causing implementation of the configured per-venue service model for service provision for at least one of a network device of the network operator and a terminal device of a subscriber of the network operator.

According to an example aspect of the present invention, there is provided an apparatus comprising means for, or a processor and a memory configured to store computer program code, wherein the processor is configured to cause the apparatus to perform, handling a service for a terminal device of a subscriber of a network operator in a network of the network operator, verifying whether a per-venue service model of services of the network operator for terminal devices of subscribers of the network operator is applicable to the handled service for the terminal device, the per-venue service model being configurable by a venue owner of a venue and including at least one configurable parameter for defining a venue-based service for terminal devices of subscribers residing in a specified venue area of the venue, and controlling provision of the handled service to the terminal device in accordance with the per-venue service model when verified to be applicable.

According to an example aspect of the present invention, there is provided an apparatus comprising means for, or a processor and a memory configured to store computer program code, wherein the processor is configured to cause the apparatus to perform, receiving a service for a terminal device of a subscriber of a network operator via a network of the network operator, and providing the received service to the subscriber, wherein the service is received and/or provided in accordance with a per-venue service model of services of the network operator for terminal devices of subscribers of the network operator, the per-venue service model being configurable by a venue owner of a venue and including at least one configurable parameter for defining a venue-based service for terminal devices of subscribers residing in a specified venue area of the venue.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, venue owner-controllable per-venue service configuration is facilitated.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
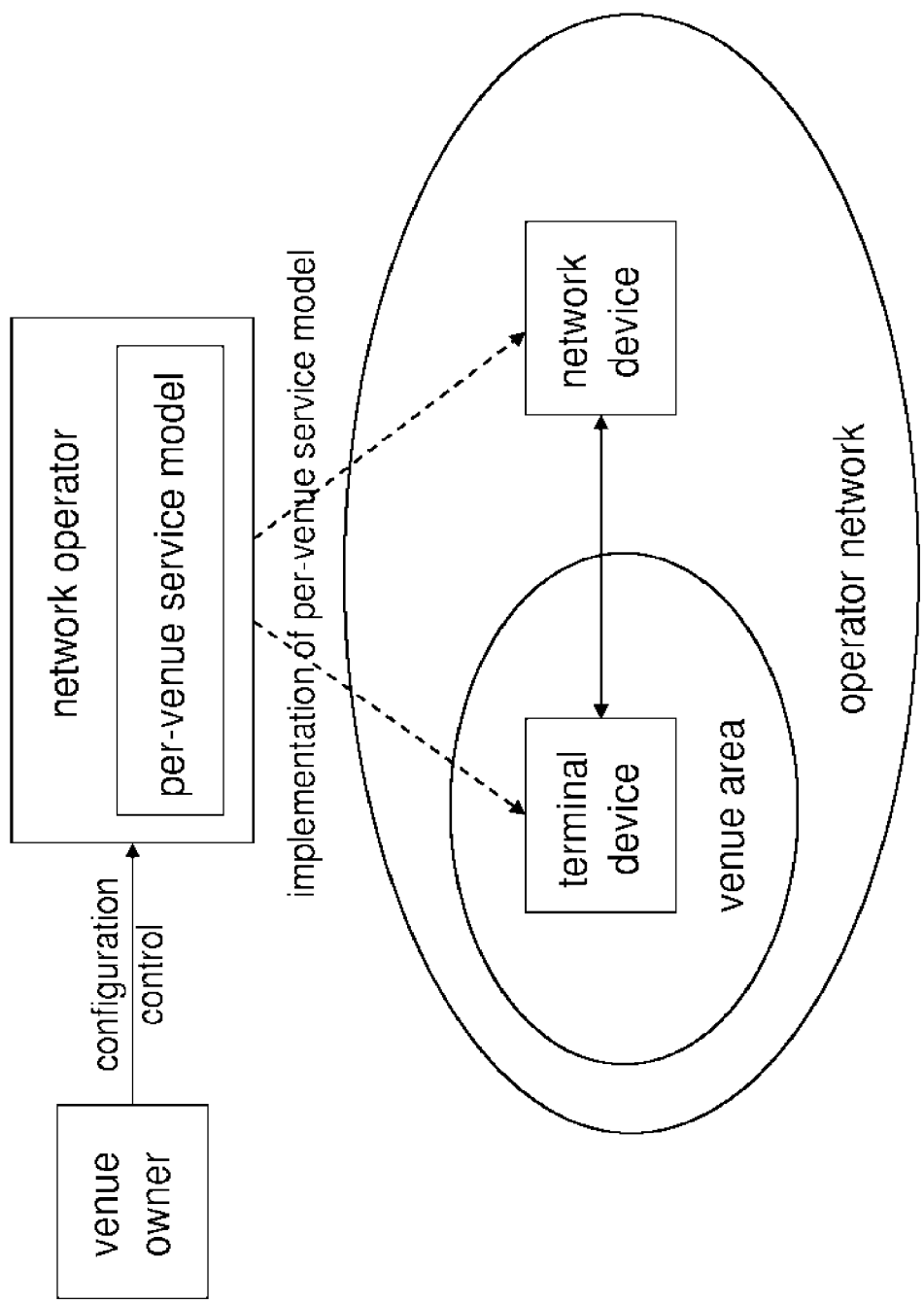
FIG. 1 shows a schematic diagram illustrating an example of a system configuration according to exemplifying embodiments of the present invention.

The present invention is described herein with reference to particular non-limiting examples and to what are presently considered to be conceivable embodiments of the present invention. A person skilled in the art will appreciate that the invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to GSM/UMTS/LTE/LTE-A specifications being used as non-limiting examples for certain exemplifying network configurations and deployments. As such, the description of exemplifying embodiments given herein specifically refers to terminology which is directly related thereto. Such terminology is only used in the context of the presented non-limiting examples and embodiments, and does naturally not limit the invention in any way. Rather, any other network configuration or system deployment, etc. may also be utilized as long as complying with wht is described herein and/or exemplifying embodiments described herein are applicable to it.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

As used herein, an operator may be an operator of any communication network, including 2G/3G/4G communication networks such as GSM/UMTS/LTE/LTE-A systems, or the like.

As used herein, a venue may be generally any (limited) site or place, which is under the control and/or responsibility of a venue owner, and where a number of users with their terminal devices may be located. For example, a venue may be a locality such as a campus, a (e.g. religious) place, a stadium, an office building, a shopping center, or the like. Namely, the term "venue owner" is to be construed in a broadest manner.

As used herein, a venue owner may be any person or authority, which "owns" a venue in the sense to have control and/or responsibility for the venue. Namely, the term "venue owner" is to be construed in a broadest manner, encompassing an owner in a legal sense, as well as any other responsible, or the like. Generally speaking, the venue may be regarded as a sphere (of control and/or responsibility) of the corresponding venue owner.

According to exemplifying embodiments of the present invention, in general terms, there are provided measures and mechanisms for facilitating venue owner-controllable per-venue service configuration.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

FIG. 1 shows a schematic diagram illustrating an example of a system configuration according to exemplifying embodiments of the present invention.

As shown in FIG. 1, a system configuration according to exemplifying embodiments of the present invention comprises an operator network of a network operator, which includes at least one network device. The network device is configured to handle services of the network operator for a terminal device of a subscriber of the network operator in the operator network, and to provide the handled services to the terminal device. Within the (service or coverage area) of the operator network, a venue area is located, i.e. a specified area of a venue, which is under the control and/or responsibility of a venue owner. A venue owner entity, as illustrated in FIG. 1, may represent a corresponding system, computer, client, or the like, which is configured to access a network operator entity which, as illustrated in FIG. 1, may represent a corresponding (home) system, computer, server, or the like, which is configured to control service provision of services of the network operator.

In such exemplary system configuration, the operator network may be or comprise any 2G/3G/4G communication network, such as e.g. a GSM/UMTS/LTE/LTE-A communication network. The network device may be or comprise any network device in a radio access network or on a base site level, such as a base station of a cell, a femto cell, a micro cell or a pico cell, a base transceiver station (BTS), a NodeB, an eNodeB or a relay node, or any network device in a core network or on a base site control level, such as a base station controller (BSC) or a radio network controller (RNC), or he like. The network device, including any one of the above-mentioned types of network devices could be located on a hierarchy level under a higher-hierarchy network element such as e.g. a MSC Server System (MSS), or the like. The terminal device may be or comprise any device on the terminal/endpoint side of a communication network or system, such as e.g. a mobile station (MS) or a user equipment (UE), or the like.

As shown in FIG. 1, the network operator entity holds and manages a per-venue service model of services of the network operator. The per-venue service model is a service model for terminal devices of subscribers of the network operator, and includes at least one configurable parameter for defining a venue-based service for terminal devices of subscribers residing in a specified venue area of a venue. Further, the network operator entity is able to configure the per-venue service model on the basis of an input by the venue owner of the venue, and to cause implementation of the configured per-venue service model for service provision for/in/at at least one of a network device of the network operator and a terminal device of a subscriber of the network operator.

The per-venue service model according to exemplifying embodiments of the present invention includes the at least one configurable parameter, which may be for defining a type of service and/or application for which the per-venue service model is applicable. For example, such type of service/application may include a mobile-terminated voice or data call or messaging service (including e.g. Skype, Yahoo messenger, etc.), a mobile-originated voice or data call or messaging service (including e.g. Skype, Yahoo messenger, etc.), any other type of MT/MO service/call (such as e.g. CSFB), a CS domain service, a PS domain service, a (RBT-based) advertisement announcement and/or replay feature, or the like. Further, the at least one configurable parameter in the per-venue service model according to exemplifying embodiments of the present invention may be for defining one or more a time period (e.g. a single time window, a periodically recurring/periodic time window with a specific periodicity of e.g. a day, a week, a month or a year), in which the per-venue service model is applicable, a content and/or source for service provision in accordance with the per-venue service model (e.g. an audio, visual or audiovisual content to be reproduced to a user, service content from a specific service provider), and a control scheme for service provision in accordance with the per-venue service model (e.g. how a specific service is to be processed by a network device in the course of service handling/provisioning). Such configurability of the per-venue service model according to exemplifying embodiments of the present invention can cover or implement the concept of liquid applications.

As one non-limiting example, the per-venue service model may be defined so as to allow or inhibit issuance of a MO call (i.e. a MO voice and/or data call) and/or reception of a MT call (i.e. a MT voice and/or data call) during the time of a religious activity or gathering for all terminal devices or their users residing in the area of a religious place. As another non-limiting example, the per-venue service model may be defined for a service by which a specific content is played to terminal devices or their users residing in the specific venue are with the (pre-defined or real-time) control of the venue owner, such as e.g. providing the replay of a goal in a soccer match and/or advertisements during the half-time break of the soccer match to the audience in a stadium, which may be controlled by the owner, tenant or operator of the stadium. As still another non-limiting example, the per-venue service model may be defined for a CSFB service/call in that CSFB is enabled/activated for terminal devices residing in a specific (venue) area, e.g. in a specific cell of a 4G (LTE/LTE-A) network, wherein a MT (VoLTE) call to a LTE/LTE-A-capable terminal device, being SGs-associated in the VLR, is handled in the MSS/VLR by sending a page (a CS page via LTE/LTE-A access) towards an appropriate MME (which may be selected based on MME FQDN), the current location of the called terminal device is retrieved from the MME, and CSFB service is applied for the called terminal device such that the MT (VoLTE) call is transferred from the 4G (LTE/LTE-A) network to a 2G/3G network. Otherwise, when the CSFB service is not applied to the non-fulfillment of a condition such as the terminal residing in the specific cell, MT (VoLTE) call is provided via the 4G (LTE/LTE-A) network. Such CSFB service may be configured to be applied for a specific time, and the MT (VoLTE) call can be transferred back from the 2G/3G network to the 4G (LTE/LTE-A) network after lapse of this specific time.

In the per-venue service model according to exemplifying embodiments of the present invention, the venue area may be specified by one or more cells (or cell IDs) of the operator network, together with their associated one or more location areas (or location area codes (LACs)), or by a dedicated location area (or location area code (LAC)) comprising one or more cells of the operator, or by a dedicated geographical area definition (such as e.g. a geographical center and a radius (and potentially also a sector definition) for the venue area). That is, the specified venue area may utilize a conventionally available network area definition or a newly defined network area definition or a newly defined (network-independent) area definition for the purpose of pre-venue service configuration according to exemplifying embodiments of the present invention. In case of a network area definition, a network device may determine whether or not a terminal device resides within the specified venue area. In case of a (network-independent) area definition, a terminal device may determine whether or not it resides within the specified venue area (by way of positioning-related computations), or a network device may determine whether or not a terminal device resides within the specified venue area when the terminal device has previously provided its current position information to the network device.

As shown in FIG. 1, the venue owner entity effects configuration control on the network operator entity, i.e. to control configuration of the per-venue service model for/in/at the network operator entity. Specifically, the venue owner entity, or the venue owner as such, is able to access a configuration tool for the per-venue service model, and to input a setting vale for the at least one configurable parameter of the per-venue service model. Such control or, in particular such accessing, may be effected by a graphical user interface (GUI) at the venue owner entity and/or by a specific connection between the venue owner entity and the network operator entity, e.g. using at least one of a pre-defined port of the network operator entity, predefined address (e.g. IP address) of the network operator entity, a specified username of the venue owner or the venue owner entity, a specified password of the venue owner or the venue owner entity, and/or some authentication or encryption techniques or mechanisms. Generally, although configuration control is exemplarily illustrated to be effected from a venue owner entity, the per-venue service model of the network operator can be controlled from any entity or network device having access to the network operator entity, including any network device on any hierarchy level in the system configuration.

Figure 2:
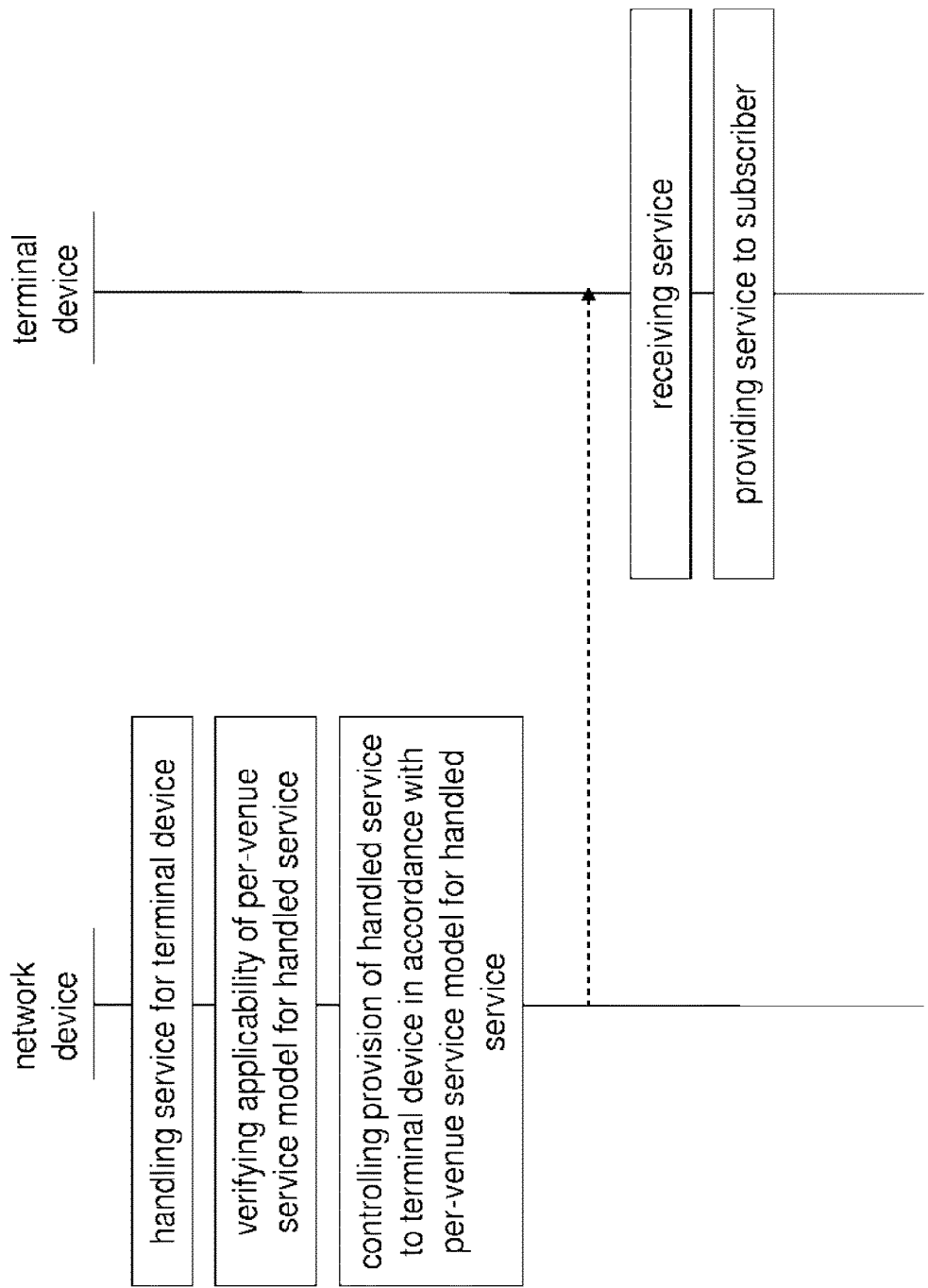
FIG. 2 shows a diagram illustrating a first example of a procedure according to exemplifying embodiments of the present invention.

FIG. 2 shows a diagram illustrating a first example of a procedure according to exemplifying embodiments of the present invention. The procedure of FIG. 2 may be referred to as a (fully) network-assisted procedure according to exemplifying embodiments of the present invention, and is applicable e.g. in the system configuration of FIG. 1.

As shown in FIG. 2, a procedure according to exemplifying embodiments of the present invention comprises, at the network device, an operation of handling a service for the terminal device in the operator network, an operation of verifying whether a per-venue service model of services of the network operator is applicable to the handled service for the terminal device, and an operation of controlling provision of the handled service to the terminal device (via the operator network) in accordance with the per-venue service model when verified to be applicable. Otherwise, when verified to be inapplicable, the per-venue service model is not utilized for service provision or control thereof, and the handled service is provided to the terminal device (via the operator network) in a normal manner. Service provisioning control can be accomplished on a location basis (e.g. a per cell basis), an activity basis, or the like.

As shown in FIG. 2, a procedure according to exemplifying embodiments of the present invention comprises, at the terminal device, an operation of receiving the service for the terminal device via the operator network, and an operation of providing the received service to the subscriber of the terminal device. In the present case, a decision of whether or not a terminal device or its user is qualified for application of a per-venue service controlled on the network side.

In the present procedure, the service provision is assumed to be (fully) controlled in accordance with the per-venue service model at the network device (i.e. the network device exhibits full service control). Stated in other words, the service is received at the terminal device in accordance with the per-venue service model. Accordingly, the terminal device is not required to effect a further control on the received service, i.e. no verification of the applicability of the per-venue service model to the received serviced and no control of the provision of the received service to the subscriber in accordance with the per-venue service model are required at the terminal device.

Figure 8:
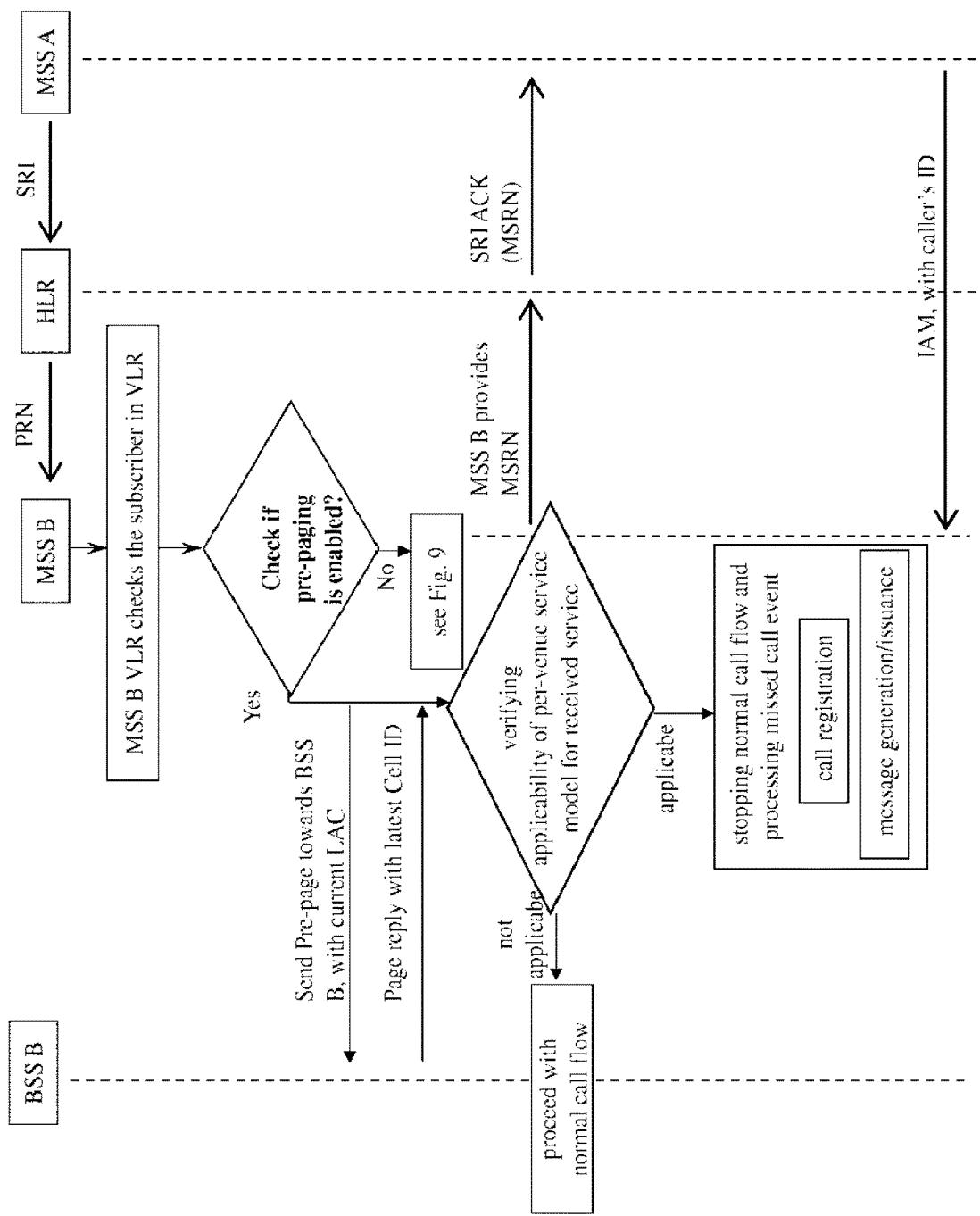
FIG. 8 shows a diagram illustrating an example of a network-assisted procedure with pre-paging according to exemplifying embodiments of the present invention.
Figure 9:
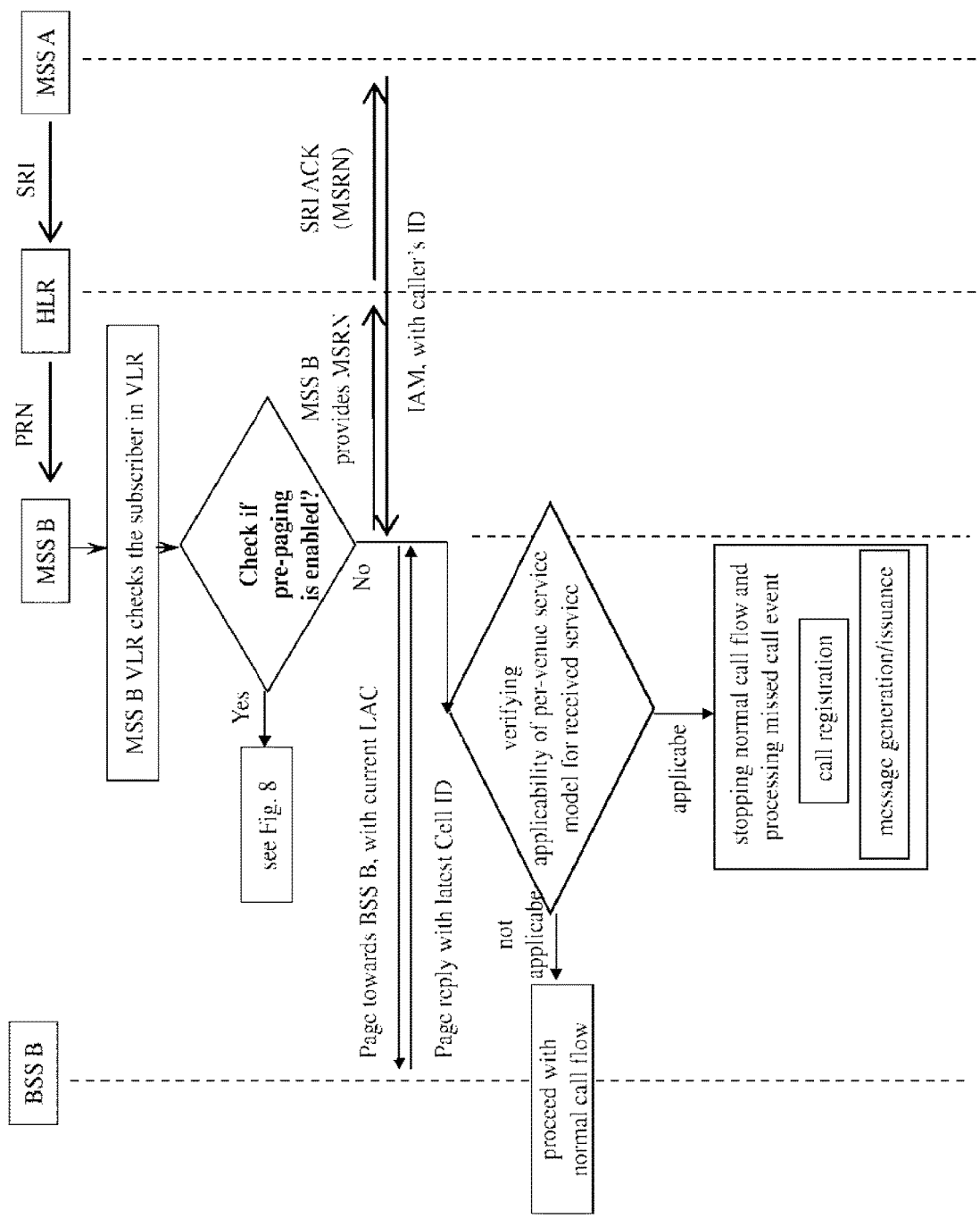
FIG. 9 shows a diagram illustrating an example of a network-assisted procedure without pre-paging according to exemplifying embodiments of the present invention.

For an illustrative example for the application of such procedure, reference is made to FIGS. 8 and 9.

Figure 3:
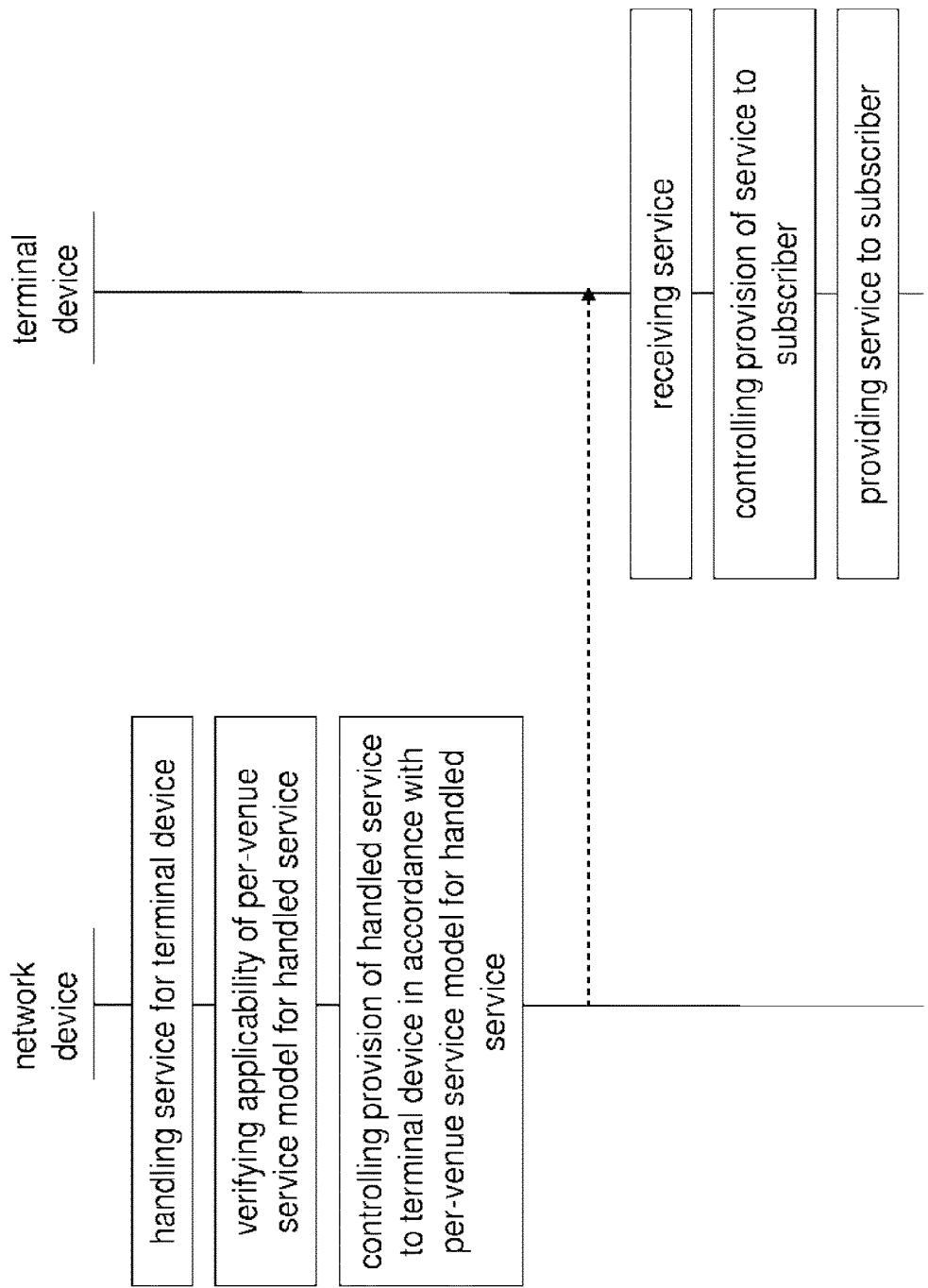
FIG. 3 shows a diagram illustrating a second example of a procedure according to exemplifying embodiments of the present invention.

FIG. 3 shows a diagram illustrating a second example of a procedure according to exemplifying embodiments of the present invention. The procedure of FIG. 3 may be referred to as a network-assisted and terminal-supported procedure according to exemplifying embodiments of the present invention, and is applicable e.g. in the system configuration of FIG. 1.

As shown in FIG. 3, a procedure according to exemplifying embodiments of the present invention comprises, at the network device, an operation of handling a service for the terminal device in the operator network, an operation of verifying whether a per-venue service model of services of the network operator is applicable to the handled service for the terminal device, and an operation of controlling provision of the handled service to the terminal device (via the operator network) in accordance with the per-venue service model when verified to be applicable. Otherwise, when verified to be in applicable, the per-venue service model is not utilized for service provision, and the handled service is provided to the terminal device (via the operator network) in a normal manner. Service provisioning control can be accomplished on a location basis (e.g. a per cell basis), an activity basis, or the like.

As shown in FIG. 3, a procedure according to exemplifying embodiments of the present invention comprises, at the terminal device, an operation of receiving the service for the terminal device via the operator network, an operation of controlling provision of the received service to the subscriber, and an operation of providing the received service to the subscriber of the terminal device in accordance with the service provision control of the terminal device. In the present case, a decision of whether or not a terminal device or its user is qualified for application of a per-venue service controlled on the network side or the terminal side.

In the present procedure, the service provision to the terminal device is assumed to be controlled in accordance with the per-venue service model at the network device, and the service provision to the subscriber is assumed to be controlled at the terminal device (i.e. the network device and the terminal device exhibit a common/combined service control, wherein the portion of service control being exhibited at the network device and the service device may vary). Stated in other words, the service is received at the terminal device in accordance with the per-venue service model. Yet, the terminal device is configured to effect a further control on the received service on the basis of its provision in accordance with the per-venue service model, while no verification of the applicability of the per-venue service model to the received service is required at the terminal device. Service provisioning control can be accomplished on a location basis (e.g. a per cell basis), an activity basis, or the like.

Figure 10:
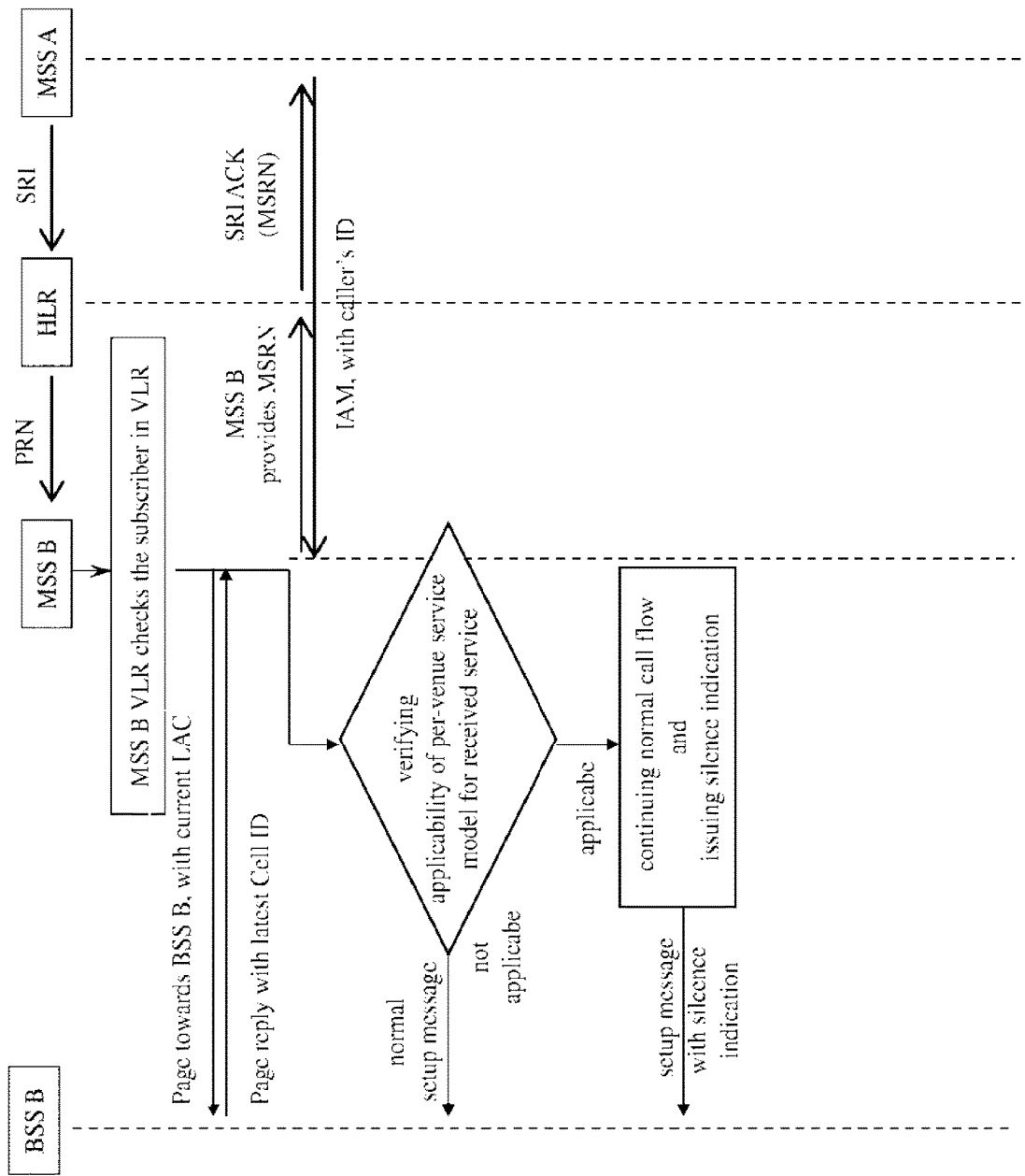
FIG. 10 shows a schematic diagram illustrating an example of a network-assisted and terminal-supported procedure with or without pre-paging according to exemplifying embodiments of the present invention.

For an illustrative example for the application of such procedure, reference is made to FIG. 10.

In the procedures of any one of FIGS. 2 and 3, the service provision or control thereof may comprise an operation of providing the handled service to the terminal device with the content and/or from the source, as defined in the at least one configurable parameter of the per-venue service model, and/or an operation of providing the handled service to the terminal device based on the control scheme, as defined in the at least one configurable parameter of the per-venue service model. For example, in the illustrative examples of FIGS. 8 and 9, which relate to the service of a mobile-terminated call, the defined control scheme for mobile-terminated calls may comprise stopping a call flow towards the terminal device and processing a missed call event for the terminal device so as to provide a venue-based service for mobile-terminated calls by suppressing a call arrival tone (or, ringing tone) at the terminal device for mobile-terminated calls. For example, in the illustrative example of FIG. 10, which relates to the service of a mobile-terminated call, the defined control scheme for mobile-terminated calls may comprise continuing a call flow towards the terminal device and issuing an indication for suppressing the call arrival tone for the mobile-terminated call at the terminal device so as to provide a venue-based service for mobile-terminated calls by suppressing a call arrival tone at the terminal device for mobile-terminated calls.

Figure 4:
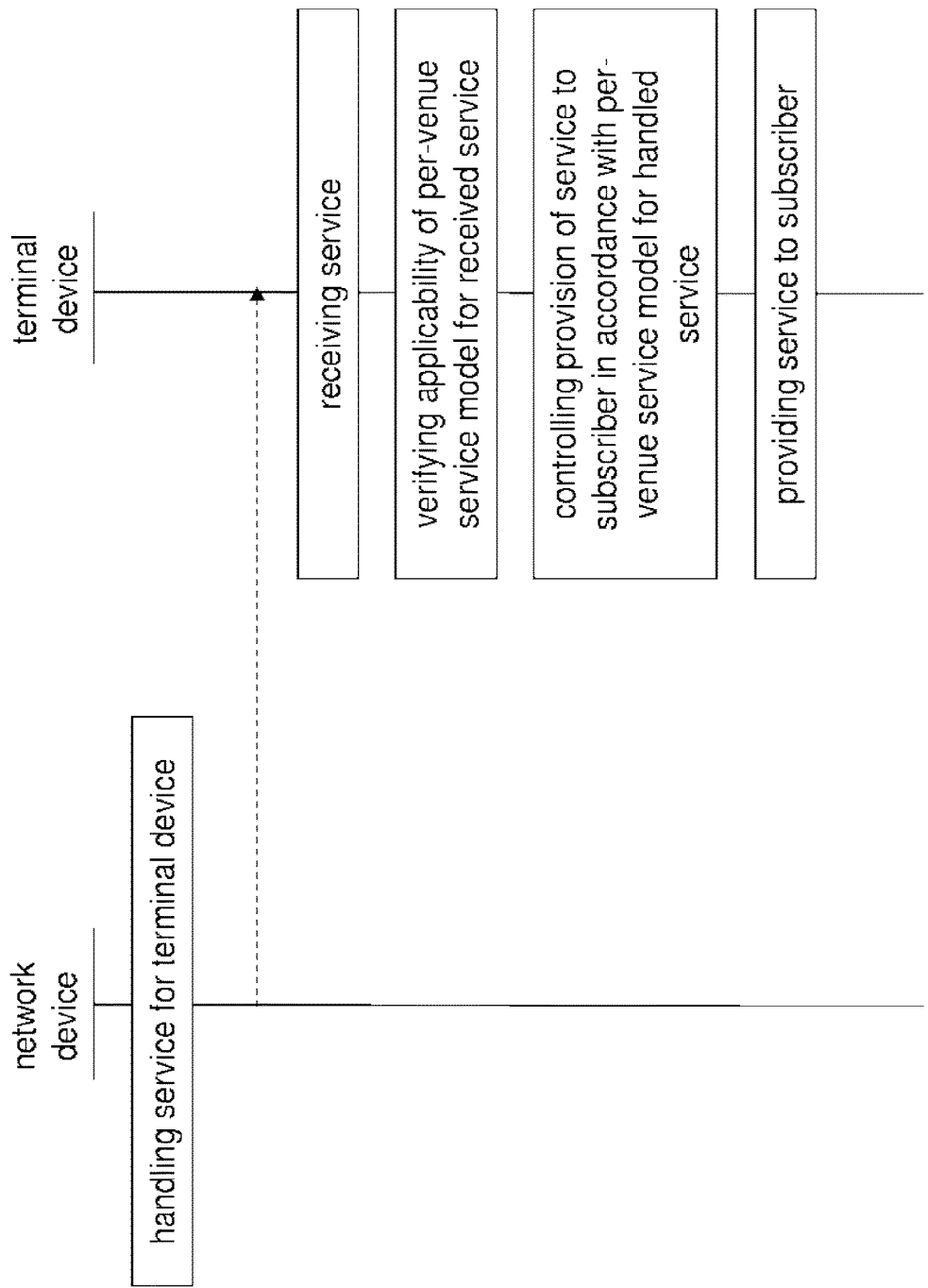
FIG. 4 shows a diagram illustrating a third example of a procedure according to exemplifying embodiments of the present invention.

FIG. 4 shows a diagram illustrating a third example of a procedure according to exemplifying embodiments of the present invention. The procedure of FIG. 4 may be referred to as a (fully) terminal-supported procedure according to exemplifying embodiments of the present invention, and is applicable e.g. in the system configuration of FIG. 1.

As shown in FIG. 4, a procedure according to exemplifying embodiments of the present invention comprises, at the network device, an operation of handling a service for the terminal device in the operator network, and an operation of providing the service to the terminal device (via the operator network) in a normal manner.

As shown in FIG. 4, a procedure according to exemplifying embodiments of the present invention comprises, at the terminal device, an operation of receiving the service for the terminal device via the operator network, an operation of verifying whether a per-venue service model of services of the network operator is applicable to the received service for the terminal device, an operation of controlling provision of the received service to the subscriber of the terminal device in accordance with the per-venue service model when verified to be applicable, and an operation of providing the received service to the subscriber of the terminal device. Otherwise, when verified to be inapplicable, the per-venue service model is not utilized for service provision or control thereof, and the received service is provided to the subscriber of the terminal device in a normal manner. In the present case, a decision of whether or not a terminal device or its user is qualified for application of a per-venue service controlled on the terminal side In the present procedure, the service provision is assumed to be (fully) controlled in accordance with the per-venue service model at the terminal device (i.e. the terminal device exhibits full service control). Stated in other words, the service is received at the terminal device in a normal manner, and the received service is provided to the subscriber at the terminal device in accordance with the per-venue service model. Accordingly, the terminal device effects a control on the received service, i.e. both verification of the applicability of the per-venue service model to the received serviced and control of the provision of the received service to the subscriber in accordance with the per-venue service model.

In the procedures of FIG. 4, the service provision or control thereof may comprise an operation of providing the received service to the subscriber with the content and/or from the source, as defined in the at least one configurable parameter of the per-venue service model, and/or an operation of providing the received service to the subscriber based on the control scheme, as defined in the at least one configurable parameter of the per-venue service model. For example, in an example relating to the service of a mobile-terminated call, the defined control scheme for mobile-terminated calls may comprise suppressing the call arrival tone (or, ringing tone) for the mobile-terminated call at the terminal device so as to provide a venue-based service for mobile-terminated calls by suppressing a call arrival tone at the terminal device for mobile-terminated calls.

In the present case, although the full service control/provision will happen at the terminal device, the network device may provide some indication or trigger to the terminal device, which indicates or triggers that the current service/session should be handled under a per-venue service model by the terminal device.

In the procedures of any one of FIGS. 2 to 4, a dashed arrow may illustrate some service-related functionality from the network device to the terminal device. In case of FIG. 2, such service-related functionality may represent or comprise service triggering or service indication. In case of FIG. 3, such service-related functionality may represent or comprise service triggering or service provision. In case of FIG. 4, such service-related functionality may represent or comprise service provision. Yet, it is to be noted that such illustration is to be understood as a logical functionality, but is not meant to represent a restriction to the provision of services terminating at the terminal device (rather, it is presumed that e.g. a mobile-originated call originating from the terminal device is also to be understood as a service to be provided by the operator network to the terminal device).

Figure 5:
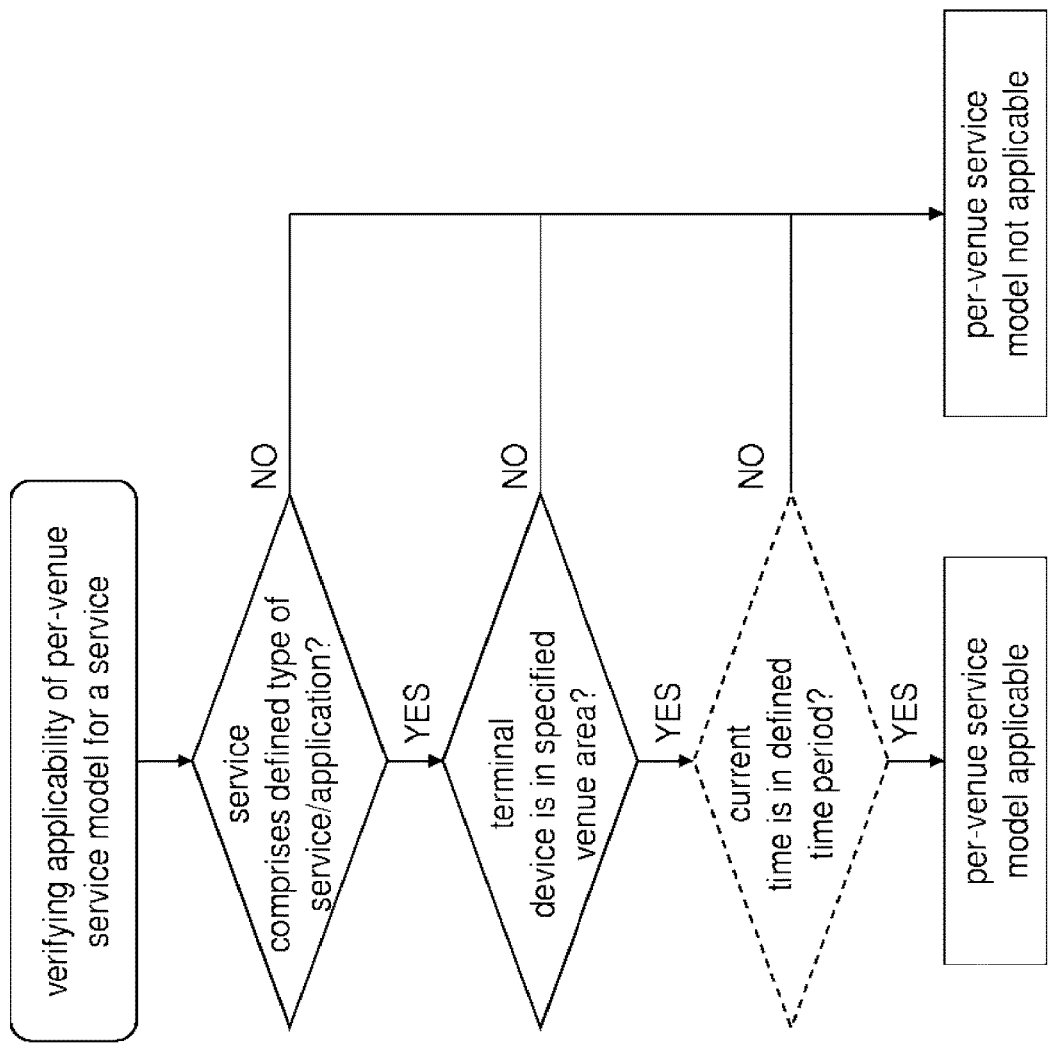
FIG. 5 shows a flowchart illustrating an example of a method for verifying applicability of a per-venue service model according to exemplifying embodiments of the present invention.

FIG. 5 shows a flowchart illustrating an example of a method for verifying applicability of a per-venue service model according to exemplifying embodiments of the present invention. The method of FIG. 5 is applicable for verification of the applicability of the per-venue service model in a procedure of any one of FIGS. 2 to 4.

As shown in FIG. 5, such method according to exemplifying embodiments of the present invention comprises an operation of checking whether the service comprises the type of service and/or application, as defined in the at least one configurable parameter of the per-venue service model. In this regard, the defined type of service and/or application of the per-venue service model may be compared with the type of service and/or application in processing. For example, a service/application type analysis based on deep packet inspection (DPI) can be used at the network device in this regard.

As shown in FIG. 5, such method according to exemplifying embodiments of the present invention further comprises an operation of checking whether the terminal device is residing in the specified venue area, as defined in/for the per-venue service model. Such check can be accomplished on the basis of a cell or a location area basis (as examples of network-related location parameters), or on the basis of a current position of the terminal device being detectable e.g. by GPS, A-GPS, or the like (as an example of a non-network-related parameter). In this regard, at least one of a current cell (or cell ID) and a current location area (or LAC) or a current position of the terminal device may be compared with the venue area definition of the per-venue service model. The terminal device may thus be determined to reside in the specified venue area when the current location area of the terminal device is fully comprised in the specified venue area, or when the current location area of the terminal device is not fully comprised in the specified venue area but the current cell of the terminal device or the current position of the terminal device (which may be defined by a geographical center position and a radius of tolerance) is comprised in the specified venue area.

As shown in FIG. 5, such method according to exemplifying embodiments of the present invention may optionally further comprises an operation of checking whether a current time is within the time period, as defined in the at least one configurable parameter of the per-venue service model. In this regard, the defined time period (time window) of the per-venue service model may be compared with the current time of processing.

When all of the checking operations performed in such method yield an affirmative result, it is determined that the per-venue service model is applicable to the service in processing. Otherwise, when one of the checking operations performed in such method yields a negative result, it is determined that the per-venue service model is not applicable to the service in processing.

It is noted that the sequence of the checking operations can be different from that illustrated in FIG. 5. Namely, any sequence of the checking operations is equally applicable. Also, one or more of the checking operations can be performed in parallel, at least in part.

Figure 6:
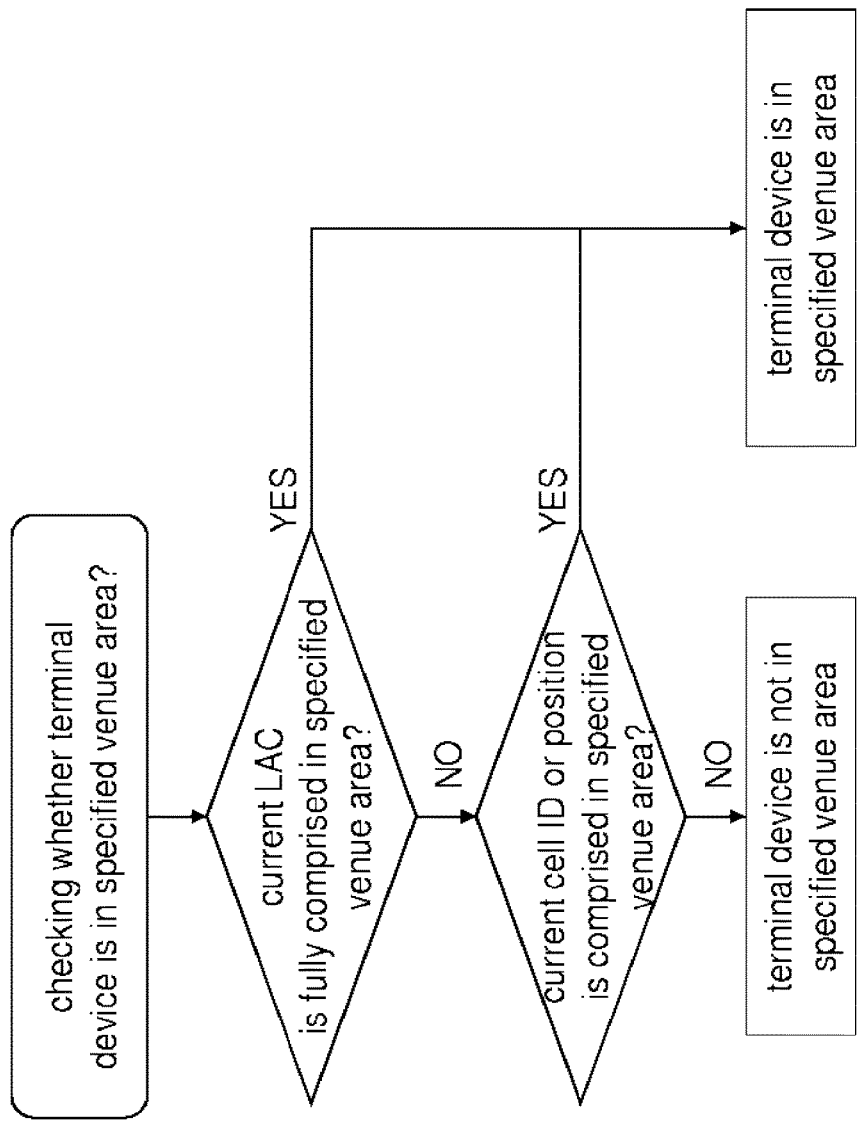
FIG. 6 shows a flowchart illustrating an example of a method for checking whether a terminal device is residing in a specified venue area according to exemplifying embodiments of the present invention.

FIG. 6 shows a flowchart illustrating an example of a method for checking whether a terminal device is residing in a specified venue area according to exemplifying embodiments of the present invention. The method of FIG. 6 is applicable for the checking operation as to whether the terminal device is residing in the specified venue area in the method of FIG. 5.

As shown in FIG. 6, it may firstly be checked whether the current LAC of the terminal device fully belongs to the defined LAC (i.e. the LAC of the defined cell/cells) of the per-venue service model. If so, the current LAC of the terminal device and, thus, the terminal device as such is determined to reside in the specified venue area. If not, it may subsequently be checked whether the current cell of the terminal device or the current position of the terminal device (which may be defined by a geographical center position and a radius of tolerance) fully belongs to the defined cell/cells of the per-venue service model. If so, the terminal device is determined to reside in the specified venue area.

When one of the checking operations performed in such method yields an affirmative result, it is determined that the terminal device is residing in the specified venue area. Otherwise, when none of the checking operations performed in such method yields an affirmative result, it is determined that the terminal device is not residing in the specified venue area.

Stated in other words, the terminal device may be determined to reside in the specified venue area when the current LAC of the terminal device itself is fully configurable in the per-venue service model by the venue owner or the cell/cell being configurable in the per-venue service model by the venue owner belong to the current LAC of the terminal device, and, in case the current LAC of the terminal device itself is not fully configurable in the per-venue service model by the venue owner, when additionally the current cell of the terminal device belongs to the cell/cell being configurable in the per-venue service model by the venue owner.

In the following, exemplifying embodiments of the present invention are described with reference to a non-limiting example use case of the above-described principles and procedures.

In the non-limiting example use case underlying the subsequent description, it is assumed that a service of a network operator, which is to be provided to terminal devices of the network operator's subscribers, is a mobile-terminated (MT) call, wherein the call may e.g. comprises a voice call or a data call. Further, it is assumed that the per-venue service model defines a venue-based service for mobile-terminated (MT) calls by suppressing a call arrival tone (e.g. a ringing tone) at the terminal device for mobile-terminated (MT) calls. Such venue-based service for mobile-terminated (MT) calls is assumed to be applicable for terminal devices residing in a specified venue area during a defined time period (time window) only.

Such non-limiting use case can for example refer to a scenario of a religious place representing the venue in question, wherein the venue area thereof may be specified by one or more cells of an operator network, which could be implemented e.g. by one or more base stations or relay nodes of a cell, a femto cell, a micro cell or a pico cell of the operator network. It is assumed that the venue owner, e.g. the parish council, wants to avoid any disturbance during religious activities or gatherings in this religious place, and thus configures a venue-based silence service, in which the specified venue area is defined as a silence zone, the times of religious activities or gatherings are defines as silence time, and the service provision in the silence zone during the silence time is defined to suppress a call arrival tone (e.g. a ringing tone) at the terminal devices for mobile-terminated (MT) calls.

Accordingly, the per-venue service model may be configured by way of corresponding configurable parameters by defining the cell or cells or geographical area of the silence zone, wherein the LAC of the relevant cell or cells could also be included in this entry, and a time period (time window) for the silence time. The time period (time window) can be a single time or a series of time instances, e.g. a periodically recurring time/occasion per day, week, month and/or year. Also, the definition of the silken zone can be accomplished by using a dedicated LAC for the one or more cells where silence is to be applied, thereby simplifying implementation.

Such non-limiting use case is described hereinafter with reference to a network deployment of 3GPP Release 10, while it is to be understood that it is equally applicable to any other network deployment as well, including any 2G/3G/4G communication network such as any GSM/UMTS/LTE/LTE-A system.

For the subsequent description of FIGS. 8 to 10, it is noted that the illustrated sequences of operations are fir illustrative purposes only, and are not to be construed as limiting. As the case may be (e.g. depending on a kind of service, or the like), different sequences of operations are equally applicable, and one or more operations can be omitted or added. For example, referring to FIGS. 8 and 9, an explicit checking operation of the enablement of a pre-paging feature may be omitted, as long as some knowledge of whether or not such pre-paging feature is enabled can be available at the relevant device or entity. Also, one or more of the operations can be performed in parallel, at least in part.

Figure 7:
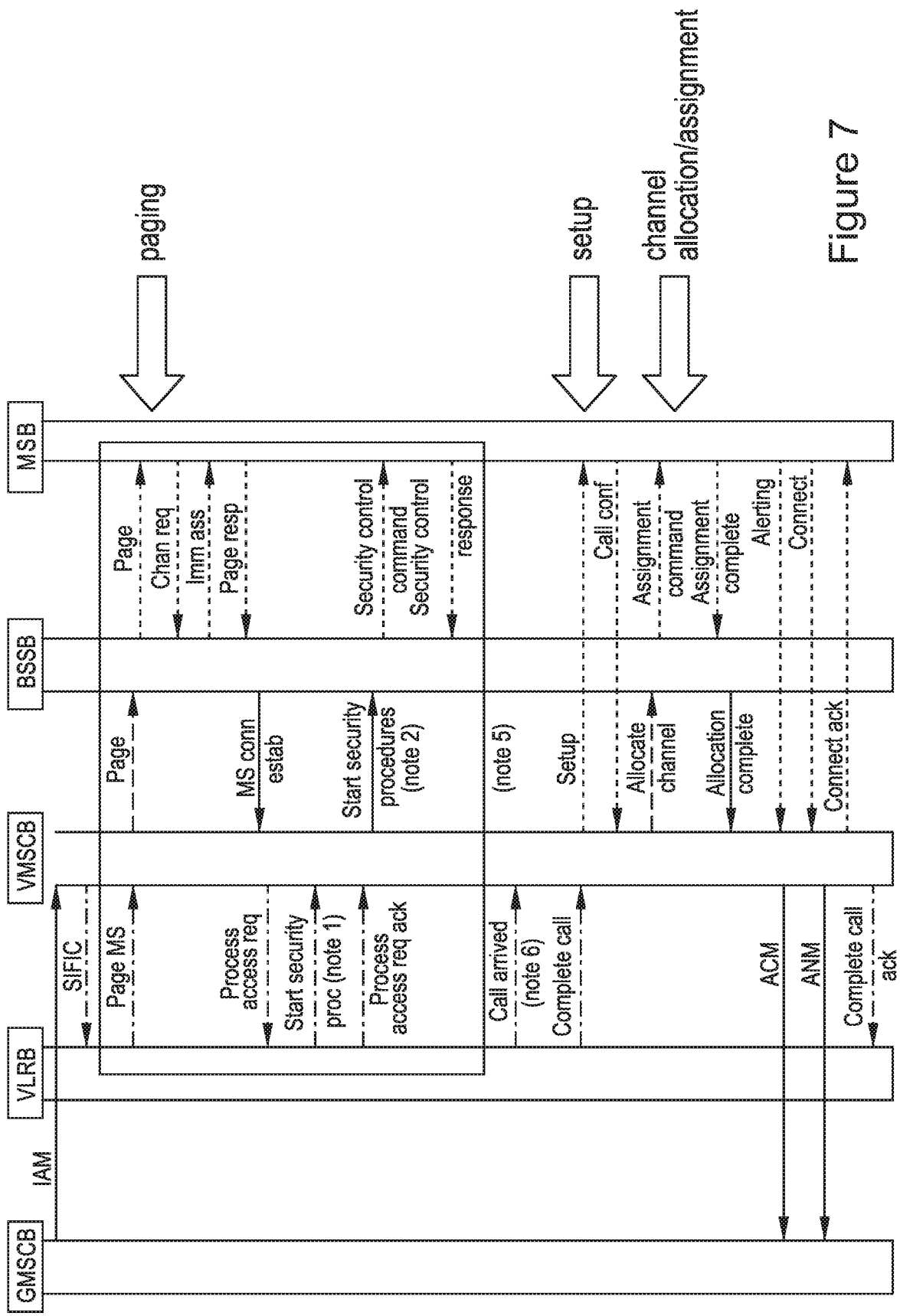
FIG. 7 shows a diagram illustrating an example of a basic mobile-terminated call flow with indications of various phases for execution of a method or procedure according to exemplifying embodiments of the present invention.

FIG. 7 shows a diagram illustrating an example of a basic mobile-terminated (MT) call flow with indications of various phases for a method or procedure according to exemplifying embodiments of the present invention.

The basic MT call flow of FIG. 7, which specifically refers to the side of the called party or terminal device, is defined in the specification 3GPP TS 23.018, V10.2.1 (2011-06), "Basic call handling, Technical Realization (Release 10)". In the denomination of the involved entities, an ending B denotes that the respective entity relate to the B party, i.e. the called party or terminal device. The individual sequences and messages of such basic MT call flow are well known to a skilled person, and a detailed description thereof is herein omitted for the sake of simplicity, while reference is made to the above-mentioned specification for details in this regard.

As shown in FIG. 7, a method or procedure according to exemplifying embodiments of the present invention is applicable at various phases of such basic MT call flow. For example, as exemplarily indicated in FIG. 7 for illustrative but not for limiting purposes, a method or procedure according to exemplifying embodiments of the present invention may be executed in a paging phase (i.e. connection with a paging message), especially a pre-paging phase (i.e. connection with a pre-paging message), a setup phase (i.e. connection with a setup message), or a channel allocation/assignment phase (i.e. connection with an allocation/assignment message).

FIGS. 8 to 10 illustrate various examples of procedures according to exemplifying embodiments of the present invention on the basis of a basic MT call flow, as illustrated in FIG. 7 and/or defined in the specification 3GPP TS 23.018, V10.2.1 (2011-06), "Basic call handling, Technical Realization (Release 10)". In the denomination of the involved entities in FIGS. 8 to 10, an ending A denotes that the respective entity relate to the A party, i.e. the calling party or terminal device, and an ending B denotes that the respective entity relate to the B party, i.e. the called party or terminal device. In the illustrated example procedures, it is assumed (to be known) that the MT call is or comprises a defined service type for the application of a per-venue service mode, and thus a corresponding service type check is omitted for the sake of simplicity.

FIG. 8 shows a diagram illustrating an example of a network-assisted procedure without pre-paging according to exemplifying embodiments of the present invention. In the procedure of FIG. 8, the MSS B or a combination of the MSS B and the BSS B, i.e. one or more network entities at the terminating side, may operate as the network device according to the procedure of FIG. 2.

As shown in FIG. 8, the MT call arrives at the B party side by way of a PRN message from the HLR of the network operator, which is caused by a SRI message from the MSS A. At the MSS B, the VLR checks the subscriber of the MT call and retrieves the current LAC of the called terminal device, and checks whether a pre-paging feature is enabled. If so (e.g. when a MSS-related feature named "Feature 1618: Pre-Paging" can be utilized), the MSS B sends a pre-page towards the BSS B with the current LAC of the called terminal device. Upon receipt of a page reply with the current cell ID of the called terminal device from the BSS B, the MSS B verifies the applicability of the implemented per-venue service model for MT calls for the handled MT call service, which may be performed according to the method of FIG. 5. When the implemented per-venue service model for MT calls is determined to be not applicable for the handled MT call service, the MT call flow proceeds in a normal manner towards the terminal device, i.e. the BSS B. When the implemented per-venue service model for MT calls is determined to be applicable for the handled MT call service, the MT call flow towards the terminal device is stopped and a missed call event for the terminal device is processed according to the per-venue service model for MT calls (or, in particular, a defined control scheme thereof).

The processing of the missed call event may be configurable, e.g. by way of the one or more configurable parameters of the per-venue service model. Such configurability of the missed call event can involve e.g. whether one or more messages are to be sent, which type of message or messages is to be sent, whether the message or messages is/are to be sent in real time or in an aggregated manner when such message or messages are to be sent (e.g. during the silence time or at the end of the silence time), and so on. Also, any one of such configurations can be defined to apply per some defined criteria.

In the context of processing of the missed call event, a missed call alert may be initiated or updated. Also, a respective announcement may be generated, and/or respective counters (e.g. for counting a number of stopped MT calls, callers, etc.) may be initiated or updated accordingly.

As one example, the processing of the missed call event may comprise generating and issuing a message for notifying the subscriber of the terminal device about the MT call which has been stopped at the MSS B. For example, a SMS message for the one MT call may be composed and sent straight away upon stopping of the MT call. Sending a SMS message instead of proceeding in a normal call flow including ringing can be accomplished using a MSS-related feature named "Feature 1606: Missed Call Logs Service".

As another example, the processing of the missed call event may comprise registering the MT call, generating one or more messages for notifying the subscriber of the terminal device about all MT calls during a predetermined time period (which may be equal to or shorter than the defined time period of the per-venue service), and issuing the one or more messages after lapse of the predetermined time period or the defined time period (e.g. the silence time). For example, one or more SMS messages for a number of registered MT calls may be composed and sent after lapse of a configurable time period, i.e. as the time window finishes. When there were more than one MT calls or callers, a number of SMS messages corresponding to the number of MT calls or callers may be composed and sent.

If direct (e.g. SMS) message delivery is possible, then the MSS B being the host of the B party may deliver the (e.g. SMS) message directly itself. Otherwise, the MSS B may give the (e.g. SMS) message to the SMS center (SMSC) or a missed call alert server (in case such is available in the operator network).

As a result of such procedure at the network device, the terminal device does not receive a MT call during the silence time when being located in the silence zone, but may receive one or more (e.g. SMS) messages indicating the stopped MT call or calls during the silence time, either in or after the silence time. That is, the terminal device receives, as the MT call service, a per-venue MT call service in the form of a message (instead of the MT call as such). The thus received pre-venue MT call service may then be provided to the subscriber by displaying the one or more (e.g. SMS) messages received from the operator network (possibly also including blinking in order to indicate message arrival). The terminal device may further suppress any message arrival tone according to the implemented per-venue service model for MT calls for the received MT call service.

In the illustrated example of per-venue service provisioning in a pre-paging phase, the MSS B provides the MSRN of the terminal device to the HLR, which may then sent a SRI ACK message together with the MSRN to the MSS A after the VLR check, and a IAM message with the caller's ID is received at the MSS B only later on (i.e. typically after the verification of pre-venue service model applicability). Upon having the caller's ID and the decision of applicability of the per-venue service model, the network device is able to compose and send a corresponding message or messages to the terminal device representing the B party as a missed call event.

FIG. 9 shows a schematic diagram illustrating an example of a network-assisted and terminal-supported procedure with or without pre-paging according to exemplifying embodiments of the present invention. In the procedure of FIG. 9, the MSS B or a combination of the MSS B and the BSS B, i.e. one or more network entities at the terminating side, may operate as the network device according to the procedure of FIG. 2.

As shown in FIG. 9, the MT call arrives at the B party side by way of a PRN message from the HLR of the network operator, which is caused by a SRI message from the MSS A. At the MSS B, the VLR checks the subscriber of the MT call and retrieves the current LAC of the called terminal device, and checks whether a pre-paging feature is enabled. If not, the MSS B sends a pre-page towards the BSS B with the current LAC of the called terminal device. Upon receipt of a page reply with the current cell ID of the called terminal device from the BSS B, the MSS B verifies the applicability of the implemented per-venue service model for MT calls for the handled MT call service, which may be performed according to the method of FIG. 5. When the implemented per-venue service model for MT calls is determined to be not applicable for the handled MT call service, the MT call flow proceeds in a normal manner towards the terminal device, i.e. the BSS B. When the implemented per-venue service model for MT calls is determined to be applicable for the handled MT call service, the MT call flow towards the terminal device is stopped and a missed call event for the terminal device is processed according to the per-venue service model for MT calls (or, in particular, a defined control scheme thereof).

The processing of the missed call event in the procedure of FIG. 9 basically corresponds to that in the procedure of FIG. 8. Thus, details in this regard are omitted here, but reference is made to the description in connection with FIG. 8 for details.

As a result of such procedure at the network device, the terminal device does not receive a MT call during the silence time when being located in the silence zone, but may receive one or more (e.g. SMS) messages indicating the stopped MT call or calls during the silence time, either in or after the silence time. That is, the terminal device receives, as the MT call service, a per-venue MT call service in the form of a message (instead of the MT call as such). The thus received pre-venue MT call service may then be provided to the subscriber by displaying the one or more (e.g. SMS) messages received from the operator network (possibly also including blinking in order to indicate message arrival). The terminal device may further suppress any message arrival tone according to the implemented per-venue service model for MT calls for the received MT call service.

In the illustrated example of per-venue service provisioning in a non-pre-paging phase (e.g. in a setup phase of a channel allocation/assignment phase), the MSS B provides the MSRN of the terminal device to the HLR, which may then sent a SRI ACK message together with the MSRN to the MSS A after the VLR check, and a IAM message with the caller's ID is received at the MSS B straight away (i.e. typically before the verification of pre-venue service model applicability). Upon having the caller's ID and the decision of applicability of the per-venue service model, the network device is able to compose and send a corresponding message or messages to the terminal device representing the B party as a missed call event.

FIG. 10 shows a schematic diagram illustrating an example of a network-assisted and terminal-supported procedure according to exemplifying embodiments of the present invention. In the procedure of FIG. 10, the MSS B or a combination of the MSS B and the BSS B, i.e. one or more network entities at the terminating side, may operate as the network device according to the procedure of any one of FIGS. 2 and 3.

As shown in FIG. 10, the MT call arrives at the B party side by way of a PRN message from the HLR of the network operator, which is caused by a SRI message from the MSS A. At the MSS B, the VLR checks the subscriber of the MT call and retrieves the current LAC of the called terminal device. Although not illustrated in FIG. 10, the thus illustrated procedure is equally applicable, whether or not a pre-paging feature is enabled. Thus, a check of the enablement of a pre-paging feature is omitted for the sake of simplicity but may be performed anyway. Then, the MSS B sends a pre-page towards the BSS B with the current LAC of the called terminal device. Upon receipt of a page reply with the current cell ID of the called terminal device from the BSS B, the MSS B verifies the applicability of the implemented per-venue service model for MT calls for the handled MT call service, which may be performed according to the method of FIG. 5.

When the implemented per-venue service model for MT calls is determined to be not applicable for the handled MT call service, the MT call flow proceeds in a normal manner towards the terminal device, i.e. the BSS B. In the illustrated example, the call flow is normally continued by way of sending a normal setup message (including a standard message header) to the BSS B.

When the implemented per-venue service model for MT calls is determined to be applicable for the handled MT call service, the MT call flow towards the terminal device is continued and indication for suppressing the call arrival tone for the MT call at the terminal device is issued according to the per-venue service model for MT calls (or, in particular, a defined control scheme thereof). In the illustrated example, the call flow is continued by way of sending a setup message with a specifically configured message header including a silence indication to the BSS B.

As a result of such procedure at the network device, the terminal device receives a MT call during the silence time when being located in the silence zone, but such MT call is received with a dedicated setup message including a silence indication (e.g. a flag, an information element, or the like) indicating an instruction to suppress the call arrival tone for the received MT call at the terminal device. That is, the terminal device receives the MT call service, and controls provision of the received MT call service to the subscriber by suppressing the call arrival tone for the MT call in response to the received indication (or instruction) for suppressing the call arrival tone for the MT call. The thus received pre-venue MT call service may then be provided to the subscriber by displaying an indication for the arrival thereof, e.g. by blinking, without producing any tone (or only a display indication tone) in connection with such display.

From a practical point of view, the terminal device, upon being alerted, i.e. having detected that the terminal device is supposed to ring in a normal call flow, the terminal device rather inhibits ringing and checks whether the relevant message (e.g. a setup message) includes a corresponding indication (e.g. a silence indication) and, if so, finally/fully prevents ringing.

In a modification of the illustrated procedure, when the implemented per-venue service model for MT calls is determined to be applicable for the handled MT call service, the MSS B may additionally (e.g. together with or in the setup message) issue information on a geographical center and a radius of the specified venue area according to the per-venue service model for MT calls (or, in particular, a defined control scheme thereof). Then, in the context of controlling provision of the received service to the subscriber, the terminal device may, upon receiving the information on a geographical center and a radius of the specified venue area, calculate the position of the terminal device, and check whether the terminal device is residing in the specified venue area on the basis of the received information and the calculated position. Accordingly, the provision of the received service may be controlled in accordance with the per-venue service model when the terminal device is determined to reside in the specified venue area. Namely, with the assumption that the terminal device is capable of determining its accurate current position, in addition to a silence indication, the radius and center of the silence zone may be sent for the relevant silence zone from network, and the terminal device may re-/determine its current position so as to determine whether it is exactly within the silence zone or not. Thereby, improvements may be achieved in terms of accuracy and location determination tolerances between the network and the terminal device.

In the illustrated example of per-venue service provisioning, applicability thereof in a non-pre-paging phase (e.g. in a setup phase of a channel allocation/assignment phase) is assumed. Thus, the MSS B provides the MSRN of the terminal device to the HLR, which may then sent a SRI ACK message together with the MSRN to the MSS A after the VLR check, and a IAM message with the caller's ID is received at the MSS B straight away (i.e. typically before the verification of pre-venue service model applicability). Yet, as indicated above, the illustrated example of per-venue service provisioning is equally applicable in a pre-paging phase, in which the IAM message with the caller's ID may be received at the MSS B only later on (i.e. typically after the verification of pre-venue service model applicability). Upon having the caller's ID and the decision of applicability of the per-venue service model, the network device is able to send a corresponding indication (in the present example, a silence indication) to the terminal device representing the B party.

According to exemplifying embodiments of the present invention, such as those illustrated in FIGS. 8 to 10, a per-venue silence service may be achieved in an efficient manner. For example, as compared with a conventional approach by using jammers or the like, the visibility of subscribers' availability for operators in their networks can be improved, (realistic) key performance indicators (KPIs) for the operator's networks can be obtained, a need for installation of jammers or other additional hardware can be avoided, and the like.

By virtue of exemplifying embodiments of the present invention, as evident from the above, venue owner-controllable per-venue service configuration is facilitated. Such venue owner-controllable per-venue service configuration may be accomplished by way of a per-venue service model according to exemplifying embodiments of the present invention Such venue owner-controllable per-venue service configuration and/or such (data centric and/or voice centric) per-venue service model according to exemplifying embodiments of the present invention enables a venue owner to effect or influence a configuration of location-aware services (i.e. per-venue services) between a subscriber and an operator, for the case that the subscriber or the subscriber's terminal device is residing within the venue area controlled by the venue owner.

Accordingly, there is provided a technique for a venue owner to host his/her/its own services/applications through configuration control of a corresponding per-venue service model for services of a network operator according to the venue owner's own needs and desires (rather then those of the network operator). Thereby, the venue owner can affect service provisioning between the network operator and the subscriber in that the venue owner is given a reasonable control to have configurable parameters of per-venue services to be provided via a network device in his/her/its venue configured per his/her/its needs, and also to host certain applications/services in his/her/its venue defined per his/her/ its control. For example, the ownership or controllability of liquid applications can thereby be given to the venue owner for his/her/its discretionary decision instead of solely by the network operator's decision.

Generally, such venue owner-controllable per-venue service configuration is applicable to many different scenarios and use cases, wherein only some illustrative examples thereof are described above in a non-limiting manner. That is, a venue owner is generally enabled to tackle specific services in terms of service provisioning within his/her/its specified venue area in a manner controllable by the venue owner, wherein such venue-owner based service provisioning control may be accomplished on a per cell basis.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 11 and 12, while for the sake of brevity reference is made to the detailed description of respective corresponding configurations/setups, schemes, methods and functionality, principles and operations according to FIGS. 1 to 10.

Figure 11:
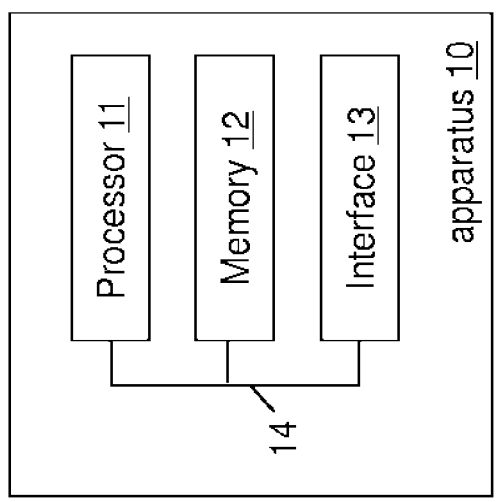
FIG. 11 shows a schematic diagram illustrating an example of a structure of apparatuses according to exemplifying embodiments of the present invention.

FIG. 11 shows a schematic diagram illustrating an example of a structure of apparatuses according to exemplifying embodiments of the present invention.

In FIG. 11, the solid line blocks are basically configured to perform respective methods, procedures and/or functions as described above. The entirety of solid line blocks are basically configured to perform the methods, procedures and/or functions as described above, respectively. With respect to FIG. 11, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 11, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

As indicated in FIG. 11, according to exemplifying embodiments of the present invention, an apparatus 10 may comprise at least one processor 11 and at least one memory 12 (and possibly also at least one interface 13), which may be operationally connected or coupled, for example by a bus 14 or the like, respectively.

The processor 11 and/or the interface 13 of the apparatus 10 may also include a modem or the like to facilitate communication over a (hardwire or wireless) link, respectively. The interface 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 13 of the apparatus 10 is generally configured to communicate with at least one other apparatus, device, node or entity (in particular, the connector thereof).

The memory 12 of the apparatus 10 may represent a (non-transitory/tangible) storage medium and store respective programs, program products, macros or applets, etc. or parts of them, which may be assumed to comprise program instructions or computer program code that, when executed by the respective processor, enables the respective electronic device or apparatus to operate in accordance with the exemplifying embodiments of the present invention.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

The thus illustrated apparatus 10 may represent or realize/embody a (part of a) network operator device according to exemplifying embodiments of the present invention, and it may be configured to perform a procedure and/or exhibit a functionality as described (for the network operator entity) in FIG. 1.

In this case, the apparatus 10 may be caused or the apparatus 10 or its processor 11 (possibly together with computer program code stored in the memory 12), in its most basic form, is configured to perform configuring a per-venue service model of services of a network operator for terminal devices of subscribers of the network operator on the basis of an input by a venue owner of a venue, the per-venue service model including at least one configurable parameter for defining a venue-based service for terminal devices of subscribers residing in a specified venue area of the venue, and causing implementation of the configured per-venue service model for service provision for at least one of a network device of the network operator and a terminal device of a subscriber of the network operator.

The thus illustrated apparatus 10 may represent or realize/embody a (part of a) network device according to exemplifying embodiments of the present invention, and it may be configured to perform a procedure and/or exhibit a functionality as described (for the network device) in any one of FIGS. 1 to 10.

In this case, the apparatus 10 may be caused or the apparatus 10 or its processor 11 (possibly together with computer program code stored in the memory 12), in its most basic form, is configured to perform handling a service for a terminal device of a subscriber of a network operator in a network of the network operator, verifying whether a per-venue service model of services of the network operator for terminal devices of subscribers of the network operator is applicable to the handled service for the terminal device, the per-venue service model being configurable by a venue owner of a venue and including at least one configurable parameter for defining a venue-based service for terminal devices of subscribers residing in a specified venue area of the venue, and controlling provision of the handled service to the terminal device in accordance with the per-venue service model when verified to be applicable.

The thus illustrated apparatus 10 may represent or realize/embody a (part of a) terminal device according to exemplifying embodiments of the present invention, and it may be configured to perform a procedure and/or exhibit a functionality as described (for the terminal device) in any one of FIGS. 1 to 10.

In this case, the apparatus 10 may be caused or the apparatus 10 or its processor 11 (possibly together with computer program code stored in the memory 12), in its most basic form, is configured to perform receiving a service for a terminal device of a subscriber of a network operator via a network of the network operator, and providing the received service to the subscriber, wherein the service is received and/or provided in accordance with a per-venue service model of services of the network operator for terminal devices of subscribers of the network operator, the per-venue service model being configurable by a venue owner of a venue and including at least one configurable parameter for defining a venue-based service for terminal devices of subscribers residing in a specified venue area of the venue.

For further details regarding the operability/functionality of the individual apparatuses according to exemplifying embodiments of the present invention, reference is made to the above description in connection with any one of FIGS. 1 to 10, respectively.

As mentioned above, any apparatus according to exemplifying embodiments of the present invention may be structured by comprising respective means for performing corresponding operations, procedures and/or functions. For example, such means may be implemented/realized on the basis of an apparatus structure, as exemplified in FIG. 11, i.e. by one or more processors 11, one or more memories 12, one or more interfaces 13, or any combination thereof.

Figure 12:
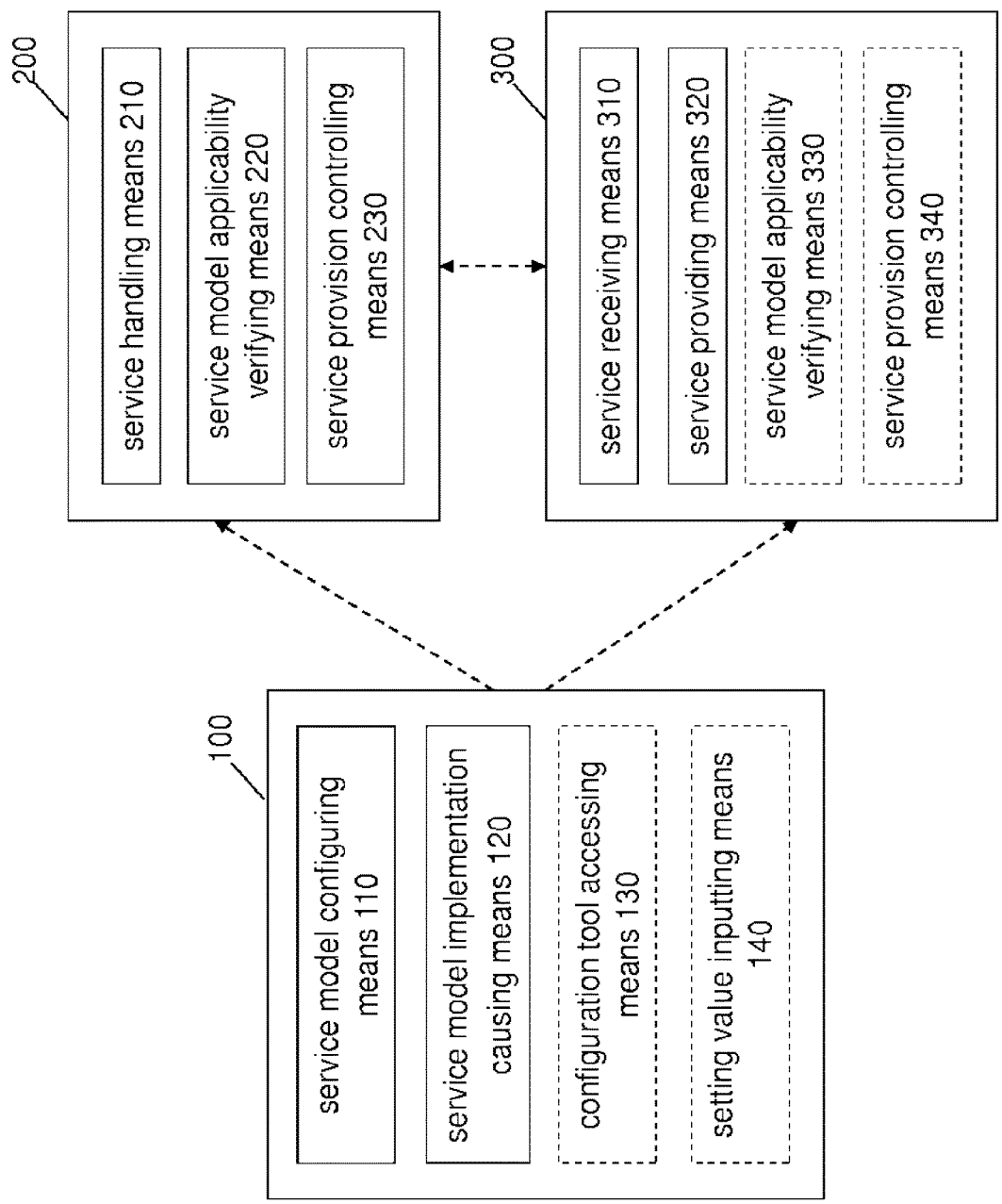
FIG. 12 shows a schematic diagram illustrating another example of a structure of apparatuses according to exemplifying embodiments of the present invention.

FIG. 12 shows a schematic diagram illustrating another example of a structure of apparatuses according to exemplifying embodiments of the present invention.

As shown in FIG. 12, an apparatus 100 according to exemplifying embodiments of the present invention may be operable as a network operator device/entity. The apparatus 100 may comprise (at least) means for configuring a per-venue service model of services of a network operator for terminal devices of subscribers of the network operator on the basis of an input by a venue owner of a venue (denoted as service model configuring means 110), and means for causing implementation of the configured per-venue service model for service provision for at least one of a network device of the network operator and a terminal device of a subscriber of the network operator (denoted as service model implementation causing means 120).

According to exemplifying embodiments, as described above, it is noted that the apparatus 100 may further comprise means for accessing a configuration tool for the per-venue service model by the venue owner using at least one of a predefined port, address, username, password, authentication or encryption (denoted as configuration tool accessing means 130), and means for inputting a setting vale for the at least one configurable parameter by the venue owner (denoted as setting value inputting means 140)

As shown in FIG. 12, an apparatus 200 according to exemplifying embodiments of the present invention may be operable as a network device. The apparatus 200 may comprise (at least) means for handling a service for a terminal device of a subscriber of a network operator in a network of the network operator (denoted as service handling means 210), means for verifying whether a per-venue service model of services of the network operator for terminal devices of subscribers of the network operator is applicable to the handled service for the terminal device (denoted as service model applicability verifying means 220), and means for controlling provision of the handled service to the terminal device in accordance with the per-venue service model when verified to be applicable (denoted as service provisioning controlling means 230).

According to exemplifying embodiments, as described above, it is noted that the apparatus 200 may further comprise one or more of:

means for checking whether the handled service comprises the defined type of service and/or application,
means for checking whether the terminal device is residing in the specified venue area on the basis of at least one of a current cell, a current location area and a current position of the terminal device,
means for checking whether a current time is within the defined time period,
means for providing the handled service to the terminal device with the defined content and/or from the defined source,
means for providing the handled service to the terminal device based on the defined control scheme,
means for generating and issuing a message for notifying the subscriber of the terminal device about the mobile-terminated call, and
means for registering the mobile-terminated call, generating one or more messages for notifying the subscriber of the terminal device about all mobile-terminated calls during a predetermined time period, which is equal to or shorter than the defined time period, and issuing the one or more messages after lapse of the predetermined time period or the defined time period.

As shown in FIG. 12, an apparatus 300 according to exemplifying embodiments of the present invention may be operable as a terminal device. The apparatus 300 may comprise (at least) means for receiving a service for a terminal device of a subscriber of a network operator via a network of the network operator (denoted as service receiving means 310), and means for providing the received service to the subscriber (denoted as service providing means 320), wherein the service receiving means is adapted to receive and/or the service providing means is adapted to provide the service in accordance with a per-venue service model of services of the network operator for terminal devices of subscribers of the network operator.

According to exemplifying embodiments, as described above, it is noted that the apparatus 300 may further comprise one or more of:

means for verifying whether the per-venue service model is applicable to the received service for the terminal device (denoted as service model applicability verifying means 330), and means for controlling provision of the received service to the subscriber in accordance with the per-venue service model when verified to be applicable (denoted as service provisioning controlling means 340), means for checking whether the received service comprises the defined type of service and/or application, means for checking whether the terminal device is residing in the specified venue area on the basis of at least one of a current cell, a current location area and a current position of the terminal device, means for checking whether a current time is within the defined time period, means for providing the received service to the subscriber with the defined content and/or from the defined source, means for providing the received service to the subscriber based on the defined control scheme, means for receiving information on a geographical center and a radius of the specified venue area, means for calculating the position of the terminal device, and means for checking whether the terminal device is residing in the specified venue area on the basis of the received information and the calculated position.

In FIG. 7, the dashed arrows indicate a possible operation of (causing) implementation of a respective per-venue service model from the apparatus 10 to the apparatus 200 and/or the apparatus 300.

According to exemplifying embodiments of the present invention, any one of the processor, the memory and the connector, as well as any one of the means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for venue owner-controllable per-venue service configuration. Such measures could comprise configuring a per-venue service model of services of a network operator for terminal devices of subscribers of the network operator on the basis of an input by a venue owner of a venue, the per-venue service model including at least one configurable parameter for defining a venue-based service for terminal devices of subscribers residing in a specified venue area of the venue, and controlling provision of services of the network operator to terminal devices or subscribers of terminal devices in accordance with the per-venue service model depending on applicability thereof for the service provision.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| 3GPP | 3rd Generation Partnership Project |
| A-GPS | Assisted Global Positioning System |
| BSC | Base Station Controller |
| BSS | Base Station Subsystem |
| BTS | Base Transceiver Station (GSM base station) |

-continued

| | |
|---|---|
| Cell ID | Cell Identification |
| CS | Circuit-Switched |
| CSFB | Circuit-Switched Fallback |
| DPI | Deep Packet Inspection |
| eNodeB | enhanced NodeB (LTE/LTE-A base station) |
| FQDN | Fully Qualified Domain Name |
| GMSC | Gateway MSC |
| GPS | Global Positioning System |
| GSM | Global System for Mobile Communications |
| GUI | Graphical User Interface |
| HLR | Home Location Register |
| IAM | Initial Access Message |
| KPI | Key Performance Indicator |
| LAC | Location Area Code |
| LTE | Long Term Evolution |
| LTE-A | Long Term Evolution Advanced |
| MS | Mobile Station (2G mobile set/handset) |
| MSC | Mobile Switching Center |
| MSRN | Mobile Subscriber Roaming Number |
| MSS | MSC Server System |
| MT | Mobile-Terminated |
| NodeB | NodeB (UMTS base station) |
| PRN | Provide Roaming Number |
| PS | Packet-Switched |
| RBT | Ring Back Tone |
| RNC | Radio Network Controller |
| SMS | Short Message Service |
| SRI | Send Routing Info |
| SRI ACK | Send Routing Info Acknowledgement |
| UE | User equipment (3G/4G mobile set/handset) |
| UMTS | Universal Mobile Telecommunications System |
| VMSC | Visited MSC |
| VLR | Visitor Location Register |
| VoLTE | Voice-over-LTE |

The invention claimed is:

1. An apparatus comprising:
a processor; and
a memory configured to store computer program code,
wherein the processor is configured to cause the apparatus
to perform receiving a service for a terminal device of a subscriber of a network operator via a network of the network operator, and
verifying whether a per-venue service model is applicable to the received service for the terminal device, the per-venue service model being configurable by a venue owner of a venue and including at least one configurable parameter for defining a venue-based service for terminal devices of subscribers residing in a specified venue area of the venue, and the at least one configurable parameter defines one or more of:
a type of service and/or application, for which the per-venue service model is applicable, a time period, in which the per-venue service model is applicable, a content and/or source for service provision in accordance with the per-venue service model, and
a control scheme for service provision in accordance with the per-venue service model, and
controlling provision of the received service to the subscriber in accordance with the per-venue service model when verified to be applicable, and
providing the received service to the subscriber.

2. The apparatus according to claim 1, wherein the venue area is specified by at least one of
one or more cells of a network of the network operator, together with their associated one or more location areas,
a dedicated location area comprising one or more cells of a network of the network operator, and
a dedicated geographical area definition comprising a geographical center and a radius.

3. The apparatus according to claim 1, wherein the processor is configured to cause the apparatus, for verifying applicability of the per-venue service model to the received service, to perform
checking whether the received service comprises the defined type of service and/or application, and
checking whether the terminal device is residing in the specified venue area on the basis of at least one of a current cell, a current location area and a current position of the terminal device.

4. The apparatus according to claim 1, wherein the processor is configured to cause the apparatus, for verifying applicability of the per-venue service model to the received service, to perform
checking whether a current time is within the defined time period.

5. The apparatus according to claim 1, wherein the processor is configured to cause the apparatus, for controlling provision of the received service, to perform
providing the received service to the subscriber with the defined content and/or from the defined source, and/or
providing the received service to the subscriber based on the defined control scheme.

6. The apparatus according to claims 1, wherein the received service is a mobile-terminated call towards the terminal device, wherein the call comprises a voice call or a data call,
the per-venue service model defines a venue-based service for mobile-terminated calls by suppressing a call arrival tone at the terminal device for mobile-terminated calls, and the defined control scheme for mobile-terminated calls comprises suppressing the call arrival tone for the mobile-terminated call at the terminal device.

7. The apparatus according to claim 6, wherein the processor is configured to cause the apparatus to perform the verifying and controlling in a pre-paging phase, a setup phase or a channel allocation/assignment phase of the mobile-terminated call towards the terminal device.

8. The apparatus according to claim 1, wherein the received service is a mobile-terminated call towards the terminal device, wherein the call comprises a voice call or a data call,
the per-venue service model defines a venue-based service for mobile-terminated calls by suppressing a call arrival tone at the terminal device for mobile-terminated calls, and the processor is configured to cause the apparatus, for providing the received service to the subscriber, to perform displaying a message for notifying the subscriber of the terminal device about the mobile-terminated call, or displaying one or more messages for notifying the subscriber of the terminal device about all mobile-terminated calls during a pre-determined time period, which is equal to or shorter than the defined time period.

9. The apparatus according to claim 8, wherein the processor is configured to cause the apparatus, for controlling provision of the received service to the subscriber, to perform suppressing a message arrival tone of the message or the one or more messages.

10. The apparatus according to 1, wherein the received service is a mobile-terminated call towards the terminal device, wherein the call comprises a voice call or a data call,
the per-venue service model defines a venue-based service for mobile-terminated calls by suppressing a call arrival tone at the terminal device for mobile-terminated calls, and the processor is configured to cause the apparatus to perform controlling provision of the received service to the subscriber, the controlling comprising suppressing the call arrival tone for the mobile-terminated call at the terminal device in response to a received indication for suppressing the call arrival tone for the mobile-terminated call at the terminal device.

11. The apparatus according to claim 10, wherein the processor is configured to cause the apparatus, for controlling provision of the received service to the subscriber, to perform receiving information on a geographical center and a radius of the specified venue area, calculating the position of the terminal device, and checking whether the terminal device is residing in the specified venue area on the basis of the received information and the calculated position, wherein the provision of the received service is controlled in accordance with the per-venue service model when the terminal device is determined to reside in the specified venue area.

12. The apparatus according to claim 1, wherein the apparatus is operable at or by the terminal device, and/or the network of the network operator comprises at least one of a network device on a base site level, such as a base station of a cell, a femto cell, a micro cell or a pico cell, a base transceiver station, a NodeB, an eNodeB or a relay node, and a network device on a base site control level, such as a base station controller or a radio network controller.

13. A method comprising:

receiving a service for a terminal device of a subscriber of a network operator via a network of the network operator;

verifying whether a per-venue service model is applicable to the received service for the terminal device, the per-venue service model being configurable by a venue owner of a venue and including at least one configurable parameter for defining a venue-based service for terminal devices of subscribers residing in a specified venue area of the venue, and the at least one configurable parameter defines one or more of:

a type of service and/or application, for which the per-venue service model is applicable, a time period, in which the per-venue service model is applicable, a content and/or source for service provision in accordance with the per-venue service model, and a control scheme for service provision in accordance with the per-venue service model, and controlling provision of the received service to the subscriber in accordance with the per-venue service model when verified to be applicable, and providing the received service to the subscriber.

14. The method according to claim 13, wherein the venue area is specified by at least one of one or more cells of a network of the network operator, together with their associated one or more location areas, a dedicated location area comprising one or more cells of a network of the network operator, and a dedicated geographical area definition comprising a geographical center and a radius.

* * * * *